(12) United States Patent
Xu et al.

(10) Patent No.: US 12,545,651 B2
(45) Date of Patent: Feb. 10, 2026

(54) DIPHENYLAMINE-LINKED CHIRAL BIS(OXAZOLINE) LIGAND WITHOUT $C_2$-SYMMETRY, SYNTHESIS METHOD AND APPLICATION THEREOF

(71) Applicant: ZHEJIANG UNIVERSITY OF TECHNOLOGY, Zhejiang (CN)

(72) Inventors: Danqian Xu, Zhejiang (CN); Yifeng Wang, Zhejiang (CN); Biao Wang, Zhejiang (CN); Zhenyuan Xu, Zhejiang (CN)

(73) Assignee: ZHEJIANG UNIVERSITY OF TECHNOLOGY, Zhejiang (CN)

( * ) Notice: Subject to any disclaimer, the term of this patent is extended or adjusted under 35 U.S.C. 154(b) by 870 days.

(21) Appl. No.: 17/614,752

(22) PCT Filed: Apr. 30, 2020

(86) PCT No.: PCT/CN2020/088254
§ 371 (c)(1),
(2) Date: Nov. 29, 2021

(87) PCT Pub. No.: WO2020/238559
PCT Pub. Date: Dec. 3, 2020

(65) Prior Publication Data
US 2022/0227719 A1    Jul. 21, 2022

(30) Foreign Application Priority Data

May 31, 2019    (CN) .......................... 201910471957.7

(51) Int. Cl.
*C07D 263/14*    (2006.01)
*B01J 31/18*    (2006.01)
*C07D 263/10*    (2006.01)

(52) U.S. Cl.
CPC ........ *C07D 263/14* (2013.01); *B01J 31/1815* (2013.01); *C07D 263/10* (2013.01); *B01J 2231/32* (2013.01); *B01J 2231/324* (2013.01); *B01J 2231/44* (2013.01); *B01J 2531/16* (2013.01); *B01J 2531/26* (2013.01)

(58) Field of Classification Search
CPC .................................................. C07D 263/14
See application file for complete search history.

(56) References Cited

FOREIGN PATENT DOCUMENTS

| CN | 108774127 A | 11/2018 |
| CN | 108822036 A | 11/2018 |
| CN | 110204468 A | 9/2019 |
| CN | 110229114 A | 9/2019 |
| JP | 2018172644 A | 11/2018 |

OTHER PUBLICATIONS

Bartlett "Exploiting Chemical Diversity for Drug Discovery" Edited by Paul A Bartlett and Michael Entzeroth, The Royal Society of Chemistry, 2006, pp. 113-118.*
"Find ETDs Home » Thesis Resources » Find ETDs" Online: "https://ndltd.org/thesis-resources/find-etds/" Accessed Jan. 31, 2023.*
Irwin "ZINC—A Free Database of Commercially Available Compounds for Virtual Screening" J. Chem. Inf. Model. 2005, 45, 177-182.*
Kim "PubChem in 2021: new data content and improved web interfaces" Nucleic Acids Research, 2021, vol. 49, Database issue Published online Nov. 5, 2020.*
STN Registry/Zregistry (CAS Registrysm) Sep. 2016 2 pages.*
Liu, Sei China Ser B-Chem | Sep. 2008 | val. 52 | No. 9 1 4324-133.*
Hargaden, Organic & Biomolecular Chemistry (2007), 5(5), 763-766.*
Chen, Organic Letters (2015), 17(21), 5236-5239, Supporting Information.*
Wang, Org. Biomol. Chem., 2018, 16, 7702-7710.*
Wang et al., "Asymmetric fluorination of indanone-2-carboxylates using a polystyrene-supported diphenylamine-linked bis(oxazoline) complex," Organic & Biomolecular Chemistry, vol. 16, No. 41, Sep. 28, 2018 (Sep. 28, 20188), ISSN: 1477-0520, pp. 7702-7710, 9 pages.

(Continued)

*Primary Examiner* — Nizal S Chandrakumar
(74) *Attorney, Agent, or Firm* — MUNCY, GEISSLER, OLDS & LOWE, P.C.

(57) ABSTRACT

The present invention discloses a diphenylamine-linked chiral bis(oxazoline) ligand without $C_2$-symmetry of formula 3 and its synthesis method and application in an asymmetric catalytic reaction, wherein $C_2$-symmetry is lost by introducing different groups into the diphenylamine backbone to realize precise control of "electronic effect" of the ligand backbone. An anthranilic acid derivative and an orthochlorobenzoic acid derivative are used as starting materials to prepare a compound of formula 1, and then the compound of formula 1 is reacted with a chiral amino alcohol compound to prepare a β-bishydroxy amide compound of formula 2, and the compound of formula 2 is further subjected to condensation to obtain the diphenylamine-linked chiral bis(oxazoline) ligand without $C_2$-symmetry of formula 3. The present invention also provides an application of a catalyst formed by coordination of the diphenylamine-linked chiral bis(oxazoline) ligand without $C_2$-symmetry with copper salt, zinc salt, nickel salt, iron salt or rhodium salt, in an asymmetric catalytic reaction.

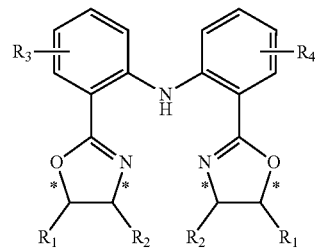

3

1 Claim, No Drawings

(56) References Cited

OTHER PUBLICATIONS

Xiong Yang. "Enantioselective 1,2-Difunctionalization of 1,3-Butadiene by Sequential Alkylation and Carbonyl Allylation," Journal of the American Chemical Society, vol. 140, No. 8, Feb. 8, 2018 (Feb. 8, 2018), ISSN: 0002-7863, pp. 2735-2738, Supporting Information S3, 6 pages.

Liu et al., "Immobilization of Diphenylamine-Linked Bis(oxazoline) Ligands and Their Application in the Asymmetric Friedel-Crafts Alkylation of Indole Derivatives with Nitroalkenes," European Journal of Organic Chemistry, No. 11, Mar. 4, 2010 (Mar. 4, 2010), ISSN: 1434-193X, pp. 2121-2131, 11 pages.

Liu et al. "Modification of diphenylamine-linked bis(oxazoline) ligands: Tuning of electronic effect and rigidity of ligand skeleton," Science in China, Series B: Chemistry, vol. 52, No. 9, Sep. 30, 2009 (Sep. 30, 2009), ISSN: 1006-9291, pp. 1321-1330, 10 pages.

Liu et al., "Asymmetric Friedel-Crafts alkylation of methoxyfuran with nitroalkenes catalyzed by diphenylamine-tethered bis(oxazoline)-Zn(II) complexes," Organic Letters, vol. 23, No. 9, Sep. 30, 2007 (Sep. 30, 2007), ISSN: 1523-7060, pp. 4725-4728, 4 pages.

Goodell et al., "Synthesis and evaluation of acridine- and acridone-based anti-herpes agents with topoisomerase activity," Bioorganic & Medicinal Chemistry, vol. 14, No. 16, May 19, 2006 (May 19, 2006), ISSN: 0968-0896, pp. 5467-5480, 14 pages.

Chu et al., "Zn-Catalyzed Enantio- and Diastereoselective Formal [4+2] Cycloaddition Involving Two Electron-Deficient Partners: Asymmetric Synthesis of Piperidines from 1-Azadienes and Nitro-Alkenes," Journal of the American Chemical Society, vol. vol. 137, No. 13, Mar. 30, 2015 (Mar. 30, 2015), ISSN: 0002-7863, pp. 4445-4452, Supporting Information S29-S48, 8 pages.

\* cited by examiner

DIPHENYLAMINE-LINKED CHIRAL BIS(OXAZOLINE) LIGAND WITHOUT C₂-SYMMETRY, SYNTHESIS METHOD AND APPLICATION THEREOF

TECHNICAL FIELD

The present invention relates to a diphenylamine-linked chiral bis(oxazoline) ligand without $C_2$-symmetry and its synthesis method and application.

BACKGROUND ART

Metal complexes, as the most common chemical catalysts, have drawn broad focus due to their high catalytic efficiency and excellent chiral induction ability, wherein chiral ligands play a critical role. In the early 1990s, Nishiyama et al. reported for the first time the first chiral bis (oxazoline) ligand Pybox and applied it to asymmetric hydrosilylation of simple ketones, and the results were excellent (Organometallics, 1991, 10: 2706-2708). Since then, various chiral bis(oxazoline) ligands with different backbone structures have been developed one after another. Since Guiry's research group for the first time introduced diphenylamine backbone into a bis(oxazoline) ligand in 2002 (Tetrahedron Letters, 1995, 36: 8745-8748), this type of ligands has also been widely used in various asymmetric reactions. In 2015, Rovis's research group reported a $C_2$-symmetric diphenylamine-linked chiral bis(oxazoline) ligand with motifs on the diphenylamine backbone and applied it to a catalytic asymmetric synthesis of piperidines through [4+2]cycloaddition of 1-azadienes and nitro-alkenes with great enantioselectivity (Journal of the American Chemical Society, 2015, 137: 4445-4452). However, the existing backbones of the chiral ligand type has a single electronic effect, and when applied to asymmetric catalytic reactions, there is still room for further improvement in the enantioselectivity of the reaction, and the types of catalytic reactions need to be further expanded.

SUMMARY OF THE INVENTION

The present invention provides a diphenylamine-linked chiral bis(oxazoline) ligand without $C_2$-symmetry, in which $C_2$-symmetry is lost by introducing different groups into the diphenylamine backbone to realize precise control of "electronic effect" of the ligand backbone, the diphenylamine-linked chiral bis(oxazoline) ligand without $C_2$-symmetry induces higher levels of enantioselectivity and has a wider range of applications than a $C_2$-symmetric diphenylamine-linked chiral bis(oxazoline) ligand, so that it has important practical application value.

The first object of the present invention is to provide a diphenylamine-linked chiral bis(oxazoline) ligand without $C_2$-symmetry.

The present invention provides a diphenylamine-linked chiral bis(oxazoline) ligand without $C_2$-symmetry of formula 3:

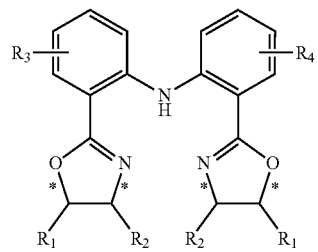

wherein
$R_1$ and $R_2$ are each independently hydrogen, $C_{1-4}$ alkyl, phenyl, benzyl, 1-naphthyl, 2-naphthyl or substituted phenyl, or $R_1$ and $R_2$ are both 2,3-dihydroindenyl; wherein the substituted phenyl is a phenyl of which H atoms on the benzene ring are mono- or di-substituted with $C_{1-4}$ alkyl, halogen or trifluoromethyl;
$R_3$ and $R_4$ are each independently hydrogen, $C_{1-4}$ alkyl, $C_{1-4}$ alkoxy, halogen, trifluoromethyl, nitro, sulfo, hydroxyl, amino or N,N-di($C_{1-4}$) alkylamino.
Obviously, $R_3$ and $R_4$ are different.

The second object of the present invention is to provide a synthesis method of the diphenylamine-linked chiral bis (oxazoline) ligand.

The synthesis method of the diphenylamine-linked chiral bis(oxazoline) ligand without $C_2$-symmetry of formula 3 in the present invention has two synthetic pathways as follows:

Pathway I: an anthranilic acid derivative of formula I and an orthochlorobenzoic acid derivative of formula II are used to prepare a compound of formula 1 through a coupling reaction, and then the compound of formula 1 is chlorinated and then reacted with a chiral amino alcohol compound of formula 4 to prepare a β-bishydroxy amide compound of formula 2, and the compound of formula 2 is further cyclized to obtain the diphenylamine-linked chiral bis(oxazoline) ligand without $C_2$-symmetry.

Pathway II and pathway I differ in the synthesis method of the 0-bishydroxy amide compound of formula 2, in Pathway II the compound of formula 1 is used to prepare the β-bishydroxy amide compound of formula 2 in the presence of N-(3-dimethylaminopropyl)-N'-ethylcarbodiimide hydrochloride (EDCI·HCl) and 1-hydroxybenzotriazole(HOBt).

Reaction formulae of Pathway I and Pathway II are as follows:

Pathway I

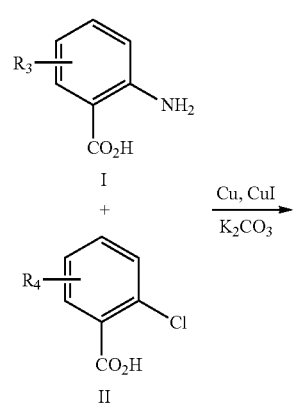

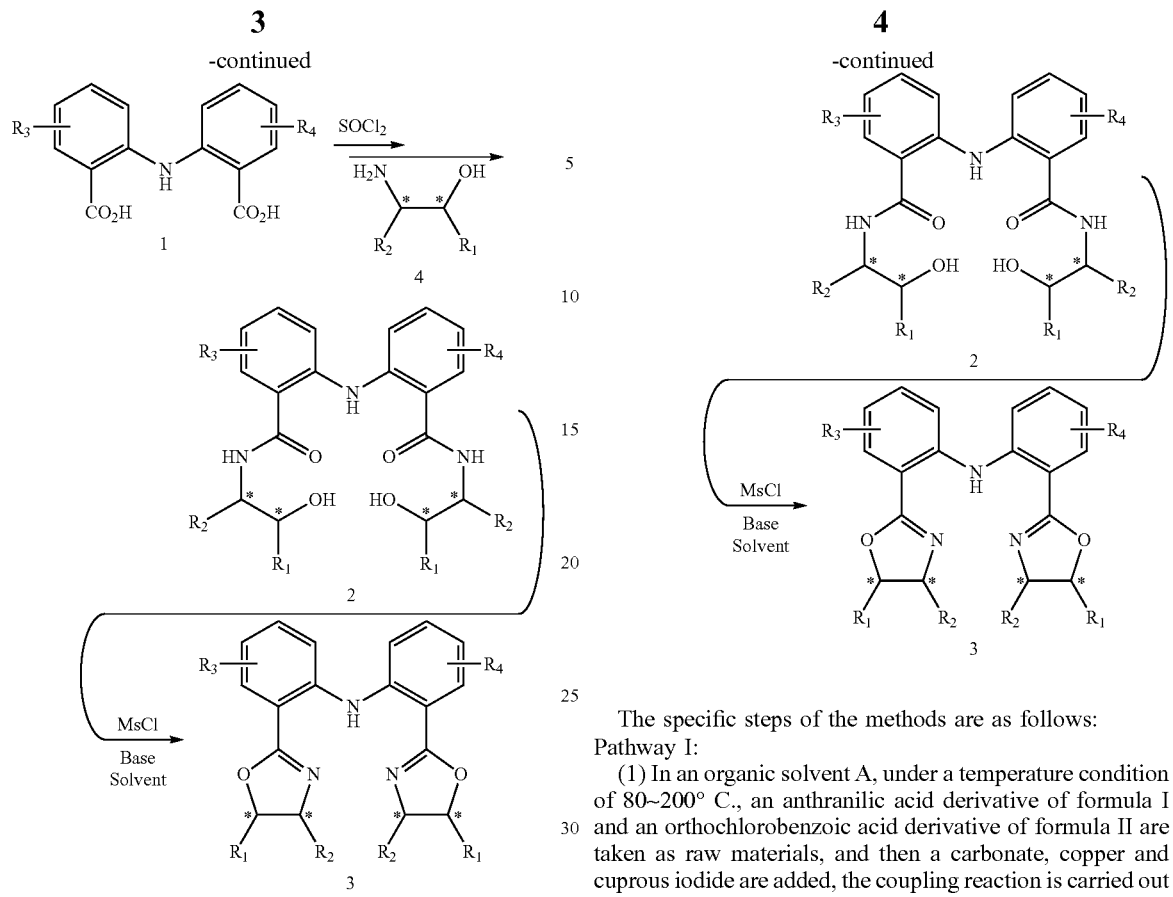

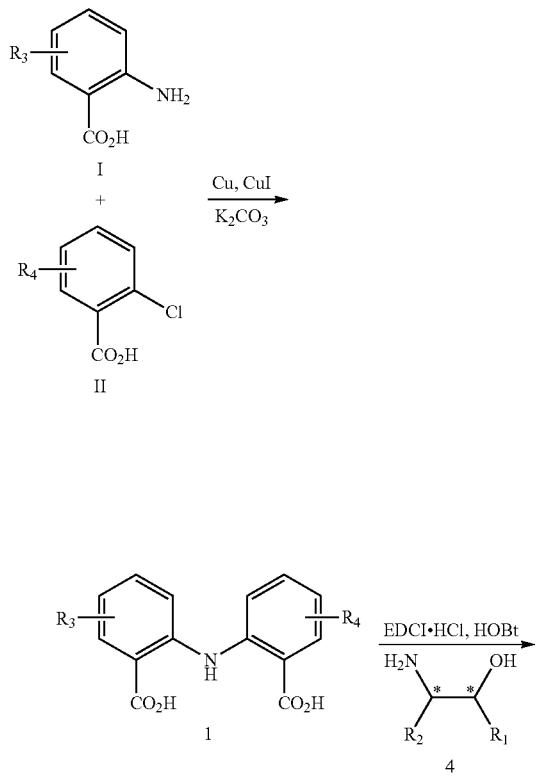

The specific steps of the methods are as follows:

Pathway I:

(1) In an organic solvent A, under a temperature condition of 80~200° C., an anthranilic acid derivative of formula I and an orthochlorobenzoic acid derivative of formula II are taken as raw materials, and then a carbonate, copper and cuprous iodide are added, the coupling reaction is carried out for 1~24 h to obtain a reaction solution A, after cooling and filtration, diluted hydrochloric acid is added to the filtrate until the pH of the solution reaches 1-4, the solution is stirred and filtered to obtain the compound of formula 1; wherein the molar ratio of the anthranilic acid derivative of formula I to the orthochlorobenzoic acid derivative of formula II, the carbonate, the copper and the cuprous iodide is 1:1:1-2:0.01-0.5:0.01-0.5;

(2) the compound of formula 1 obtained in step (1) is mixed with thionyl chloride and heated to reflux temperature for 4 h, excess $SOCl_2$ is removed by evaporation, thereby obtaining diacid chloride, the diacid chloride is added into an organic solvent B, thereby obtaining a diacid chloride solution, chiral amino alcohol and an alkaline substance A are added into another organic solvent B to obtain a mixture solution, the diacid chloride solution is added into the mixture solution dropwise at −20-20° C., and the reaction is carried out at room temperature for 1-24 h, thereby obtaining a reaction solution B; the reaction solution B is quenched with an ammonium chloride aqueous solution, extracted three times with water, saturated $NaHCO_3$ solution, and saturated brine, respectively, the resulting organic phase is dried over anhydrous sodium sulfate, the solvent is removed, and then column chromatography (PE/EA=5:1~2:1) is carried out to obtain the intermediate of formula 2, i.e. β-bis-hydroxy amide; wherein the molar ratio of the compound of formula 1 to the thionyl chloride is 1:5-10; the molar ratio of the diacid chloride to the chiral amino alcohol and the alkaline substance A is 1:2-3:1-6, wherein the amount of substance of the diacid chloride is calculated by the amount of substance of the compound of formula 1;

(3) in an organic solvent C, under a temperature condition of 0-30° C., a mixture of the β-bishydroxy amide of formula 2 in step (2), methanesulfonyl chloride and an alkaline substance B are reacted for 1-24 h, the resulting reaction solution C is evaporated to remove the solvent to obtain a crude product, and column chromatography is further used for separation to obtain the diphenylamine-linked chiral bis(oxazoline) ligand without $C_2$-symmetry of formula 3; wherein the molar ratio of the β-bishydroxy amide of formula 2 to the methanesulfonyl chloride and the alkaline substance B is 1:2-3:1-6.

Further, in step (1), the carbonate is sodium carbonate, potassium carbonate or cesium carbonate.

Further, in step (1), the organic solvent A is N,N-dimethylformamide, N,N-dimethylacetamide, N-methylpyrrolidone, dimethylsulfoxide, toluene, chlorobenzene, tetrahydrofuran, chloroform, carbon tetrachloride, dichloromethane, 1,4-dioxane or pyridine; and the additive amount of the organic solvent A calculated by the amount of substance of the anthranilic acid derivative of formula I is 1-20 mL/mmol.

Further, in step (2), the organic solvent B is toluene, xylene, chlorobenzene, tetrahydrofuran, chloroform, carbon tetrachloride, methylene chloride, 1,4-dioxane or pyridine; and the additive amount of the organic solvent B calculated by the amount of substance of the compound of formula 1 is 1-10 mL/mmol.

Further, in step (2) or (3), the alkaline substance A and the alkaline substance B are each independently triethylamine, tripropylamine, tributylamine, N,N-diisopropylmethylamine, N,N-diisopropylethylamine, tetramethyldiethylamine, sodium carbonate or potassium carbonate.

Further, the organic solvent C is toluene, xylene, chlorobenzene, tetrahydrofuran, chloroform, carbon tetrachloride or methylene chloride; and the additive amount of the organic solvent C calculated by the amount of substance of the β-bishydroxy amide of formula 2 is 1-10 mL/mmol.

Pathway II:

Except step (2'), the other steps are the same as those in Pathway I.

(2') At room temperature, chiral amino alcohol, 1-(3-dimethylaminopropyl)-3-ethylcarbodiimide hydrochloride and 1-hydroxybenzotriazole are dissolved in an organic solvent D, and then the compound of formula 1 obtained in step (1) is added and reacted at room temperature for 1-24 h to obtain a reaction solution D; the reaction solution D is quenched with an ammonium chloride aqueous solution, washed with water and extracted, the resulting organic phase is dried over anhydrous sodium sulfate, the solvent is removed, and then column chromatography is carried out to for separation, a mixing solution of PE/EA in a volume ratio ranging from 2:1 to 5:1 is used as the eluting reagent to collect an eluate containing the target product, the eluate is evaporated to remove the solvent, thereby obtaining the intermediate of formula 2, i.e. β-bishydroxy amide; wherein the molar ratio of the compound of formula 1 to the chiral amino alcohol, 1-(3-dimethylaminopropyl)-3-ethylcarbodiimide hydrochloride and 1-hydroxybenzotriazole is 1:2-3:2-3:2-3.

Further, the organic solvent D is toluene, xylene, chlorobenzene, tetrahydrofuran, chloroform, carbon tetrachloride or methylene chloride; the additive amount of the organic solvent D calculated by the amount of substance of the compound of formula 1 is 1-10 mL/mmol.

The synthesis method of the diphenylamine-linked chiral bis(oxazoline) ligand without $C_2$-symmetry of the present invention is not limited thereto, all the diphenylamine-linked chiral bis(oxazoline) ligands without $C_2$-symmetry whether substituent(s) are introduced to one side of the diphenylamine backbone, different substituents are introduced to both sides of the diphenylamine backbone, or based on the diphenylamine backbone without $C_2$-symmetry, different substituents are introduced to the oxazole rings, are within the limitation scope of the present invention.

The third object of the present invention is to provide a catalyst formed by coordination of the diphenylamine-linked chiral bis(oxazoline) ligand without $C_2$-symmetry with copper salt, zinc salt, nickel salt, iron salt or rhodium salt.

Further, the copper salt is copper chloride, copper sulfate, copper bromide, copper acetate, copper trifluoroacetate, copper trifluoromethanesulfonate, copper acetylacetonate or copper perchlorate; the zinc salt is zinc chloride, zinc sulfate, zinc bromide, zinc acetate, zinc trifluoroacetate, zinc trifluoromethanesulfonate, zinc acetylacetonate or zinc perchlorate; the nickel salt is nickel chloride, nickel sulfate, nickel biomide, nickel acetate, nickel trifluoromethanesulfonate, nickel trifluoroacetate, nickel acetylacetonate or nickel perchlorate; the iron salt is ferrous chloride, ferrous sulfate, ferrous bromide, ferrous acetate, ferrous trifluoroacetate, ferrous trifluoromethanesulfonate, ferrous acetylacetonate or ferrous perchlorate; the rhodium salt is rhodium chloride, rhodium trifluoroacetate, rhodium carbonyl chloride, bis(triphenylphosphine) rhodium carbonyl chloride, tris(triphenylphosphine)rhodium carbonyl hydride or chlorotris(triphenylphosphine)rhodium.

More further, the catalyst is applied in an asymmetric catalytic reaction.

Even more further, the asymmetric catalytic reaction is asymmetric chlorination or bromination dearomatization of β-naphthol derivatives, asymmetric fluorination, chlorination, bromination, oxidation, thiocyanation or trifluoromethylthiolation of 1,3-dicarbonyl compound, asymmetric Michael addition reaction of 1,3-dicarbonyl compound, or asymmetric Friedel-Crafts alkylation of indoles with nitroalkenes.

The scope of protection of the present invention includes common chiral bis(oxazoline) ligand metal complex-based asymmetric reactions.

Compared with prior art, advantages of the present invention are embodied in:

The present invention provides a kind of novel ligands, the synthesis method of this kind of ligands is simple, the conditions are mild, and it is suitable for industrial application. This type of ligands introduce different groups to the diphenylamine backbone, so that the "electronic effect" of the ligand backbone can be adjusted and controlled to adapt to requirements of unique electronic effects of different types of catalytic reactions when the ligands are applied to different catalytic reactions. Therefore, the purpose of improving the enantioselectivity of asymmetric catalytic reactions is achieved.

A catalyst which is the chiral complex formed by coordination of the ligand of the present invention with a metal salt, has a better enantioselectivity, wider use and important practical value in asymmetric catalytic reactions.

SPECIFIC EMBODIMENTS

The present invention will be further described in conjunction with the specific examples, but the scope of protection of the present invention is not limited thereto:

Example 1

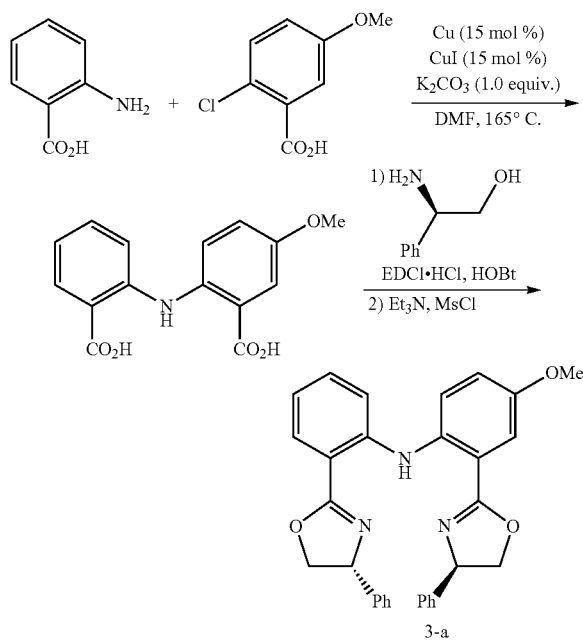

5.48 g of anthranilic acid, 7.44 g of 2-chloro-5-methoxybenzoic acid, 5.52 g of $K_2CO_3$, 0.378 g of copper powder and 1.14 g of CuI were added to a round-bottom flask and mixed, then DMF was added, and the reaction was carried out at reflux temperature for 3 hours. After cooling and filtration, diluted hydrochloric acid was added to the filtrate until the solution was weakly acidic, the resulting solution was stirred and filtered by suction to obtain a solid product 2-((2-carboxyphenyl)amino)-5-methoxybenzoic acid.

1.35 g of (R)-(−)-2-phenylglycinol, 2.20 g of 1-(3-dimethylaminopropyl)-3-ethylcarbodiimide hydrochloride and 1.55 g of 1-hydroxybenzotriazole were dissolved in THF, and then 1.44 g of 2-((2-carboxyphenyl)amino)-5-methoxybenzoic acid was added. The reaction was carried out at room temperature for 12 hours. The reaction was quenched with an ammonium chloride solution, the solvent was removed under reduced pressure, and the crude product was dissolved in ethyl acetate, washed with water, and extracted three times. The organic phase was dried over sodium sulfate, the solvent was removed, and after purification by column chromatography, the product was used directly in the next reaction.

0.9 mL of methanesulfonyl chloride and 3.3 mL of triethylamine were added to a dichloromethane solution containing the product obtained in the previous step on ice bath. After the system was stable, the reaction was carried out at room temperature for 10 hours. The reaction was quenched by a saturated ammonium chloride solution, the resulting solution was washed with brine and dried over anhydrous sodium sulfate, the solvent was removed, thereby obtaining a crude product. The crude product was purified by column chromatography (PE/EA=10:1~5:1), thereby obtaining 1.96 g of a yellow solid. The product of the reaction was a diphenylamine-linked chiral bis(oxazoline) ligand without $C_2$-symmetry of the present invention 4-methoxy-2-((R)-4-phenyl-4,5-dihydrooxazol-2-yl)-N-(2-((R)-4-phenyl-4,5-dihydro oxazol-2-yl)phenyl)aniline.

3-a: $[\alpha]_D^{20}=-261$ (c=1.0, $CH_2Cl_2$); $^1$H NMR (500 MHz, $CDCl_3$) δ 10.78 (s, 1H), 7.91-7.86 (m, 1H), 7.50 (d, J=9.0 Hz, 1H), 7.42 (d, J=3.1 Hz, 1H), 7.31-7.20 (m, 11H), 7.13 (dd, J=7.3, 2.0 Hz, 2H), 7.01 (dd, J=9.0, 3.1 Hz, 1H), 6.84 (ddd, J=8.1, 5.5, 2.8 Hz, 1H), 5.26 (dd, J=9.9, 8.1 Hz, 1H), 5.17 (dd, J=10.0, 8.3 Hz, 1H), 4.55 (dd, J=10.0, 8.3 Hz, 1H), 4.45 (dd, J=10.1, 8.4 Hz, 1H), 4.07 (t, J=8.1 Hz, 1H), 3.94 (t, J=8.3 Hz, 1H), 3.85 (s, 3H); $^{13}$C NMR (126 MHz, $CDCl_3$) δ 164.35, 164.14, 145.36, 142.39, 131.83, 130.39, 128.51, 127.29, 126.66, 123.35, 118.75, 117.85, 115.13, 114.09, 112.60, 74.22, 73.32, 70.10, 69.89, 55.74; melting point: 70-72° C.; HRMS: m/z calculated for $C_{31}H_{27}N_3O_3Na$ ([M+Na]$^+$): 512.1945; found: 512.1939.

Example 2

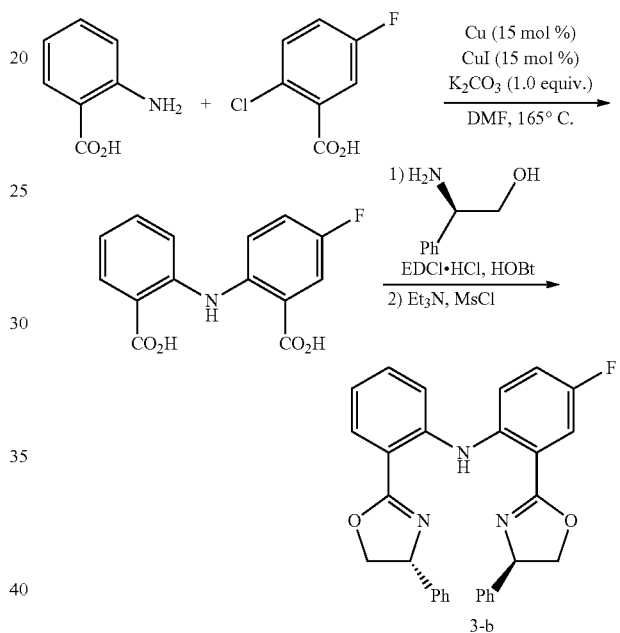

5.48 g of anthranilic acid, 6.98 g of 2-chloro-5-fluorobenzoic acid, 5.52 g of $K_2CO_3$, 0.378 g of copper powder and 1.14 g of CuI were added to a round-bottom flask and mixed, then DMF was added, and the reaction was carried out at reflux temperature for 3 hours. After cooling and filtration, diluted hydrochloric acid was added to the filtrate until the solution was weakly acidic, the resulting solution was stirred and filtered by suction to obtain a solid product 2-((2-carboxyphenyl)amino)-5-fluorobenzoic acid.

1.35 g of (R)-(−)-2-phenylglycinol, 2.20 g of 1-(3-dimethylaminopropyl)-3-ethylcarbodiimide hydrochloride and 1.55 g of 1-hydroxybenzotriazole were dissolved in THF, and then 1.10 g of 2-((2-carboxyphenyl)amino)-5-fluorobenzoic acid was added. The reaction was carried out at room temperature for 12 hours. The reaction was quenched with ammonium chloride solution, the solvent was removed under reduced pressure, and the crude product was dissolved in ethyl acetate, washed with water, and extracted three times. The organic phase was dried over sodium sulfate, the solvent was removed, and after purification by column chromatography, the product was used directly in the next reaction.

On ice bath 0.9 mL of methanesulfonyl chloride and 3.3 mL of triethylamine were added to a dichloromethane solution containing the product obtained in the previous step. After the system was stable, the reaction was carried out at room temperature for 10 hours. The reaction was quenched by a saturated ammonium chloride solution, the resulting solution was washed with brine and dried over anhydrous sodium sulfate, the solvent was removed, thereby obtaining a crude product. The crude product was purified by column chromatography (PE/EA=10:1~5:1), thereby obtaining 1.55 g of a yellow solid. The product of the reaction was a diphenylamine-linked chiral bis(oxazoline) ligand without $C_2$-symmetry of the present invention 4-fluoro-2-((R)-4-phenyl-4,5-dihydrooxazol-2-yl)-N-(2-((R)-4-phenyl-4,5-dihydrooxazol-2-yl)phenyl)aniline.

3-b: $[\alpha]D^{20}$=−260 (c=1.0, $CH_2Cl_2$); $^1H$ NMR (500 MHz, $CDCl_3$) δ 10.93 (s, 1H), 7.87 (dd, J=7.9, 1.4 Hz, 1H), 7.53 (ddd, J=33.1, 9.2, 3.9 Hz, 2H), 7.42-7.00 (m, 13H), 6.89 (t, J=7.5 Hz, 1H), 5.16 (q, J=10.3 Hz, 2H), 4.47 (ddd, J=13.3, 10.0, 8.4 Hz, 2H), 4.04-3.93 (m, 2H); $^{13}C$ NMR (126 MHz, $CDCl_3$) δ 142.53, 131.68, 128.50, 128.48, 127.29, 126.59, 126.57, 119.28, 118.49, 116.67, 116.65, 73.98, 73.54, 70.00; $^{19}F$ NMR (376 MHZ, $CDCl_3$) δ −122.66; melting point: 55-58° C.; HRMS: m/z calculated for $C_{30}H_{24}FN_3O_2Na$ ([M+Na]$^+$):500.1745; found: 500.1742.

Example 3

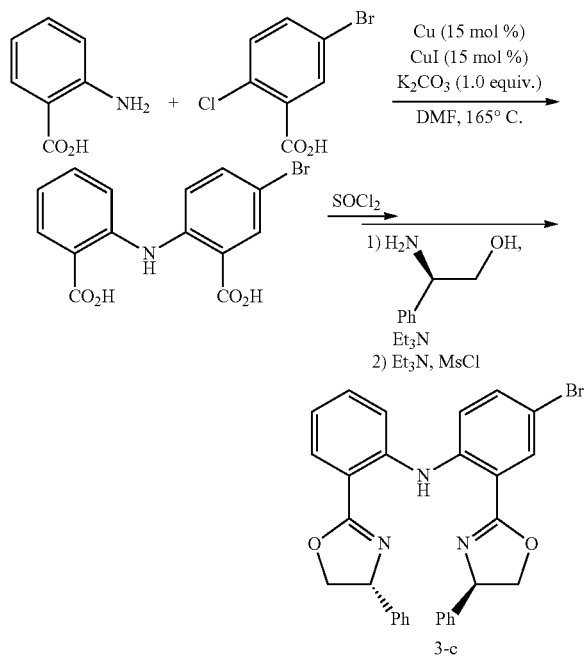

3-c 5.48 g of anthranilic acid, 9.42 g of 2-chloro-5-bromobenzoic acid, 5.52 g of $K_2CO_3$, 0.378 g of copper powder and 1.14 g of CuI were added to a round-bottom flask and mixed, then DMF was added, and the reaction was carried out at reflux temperature for 3 hours. After cooling and filtration, diluted hydrochloric acid was added to the filtrate until the solution was weakly acidic, the resulting solution was stirred and filtered by suction to obtain a solid product 2-((2-carboxyphenyl)amino)-5-bromobenzoic acid.

1.68 g of 2-((2-carboxyphenyl)amino)-5-bromobenzoic acid and 10 mL of $SOCl_2$ were added to a round-bottom flask and heated to reflux temperature for 4 h, excess $SOCl_2$ was removed by evaporation, thereby obtaining diacid chloride, the diacid chloride was added to dichloromethane. On ice bath, the dichloromethane solution of the diacid chloride was added dropwise to a dichloromethane solution containing 1.35 g of (R)-(−)-2-phenylglycinol and 3.8 mL of trimethylamine. The resulting solution was stirred for 20 h. The reaction was quenched with ammonium chloride solution, extracted by water, saturated sodium bicarbonate solution and saturated brine three times, respectively. The organic phase was dried over anhydrous sodium sulfate, the solvent was removed, and after purification by column chromatography, the product was used directly in the next reaction.

0.9 mL of methanesulfonyl chloride and 3.3 mL of triethylamine were added to a dichloromethane solution containing the product obtained in the previous step on ice bath. After the system was stable, the reaction was carried out at room temperature for 10 hours. The reaction was quenched by a saturated ammonium chloride solution, the resulting solution was washed with brine and dried over anhydrous sodium sulfate, the solvent was removed, thereby obtaining a crude product. The crude product was purified by column chromatography (PE/EA=10:1~5:1), thereby obtaining 2.15 g of a yellow solid. The product of the reaction was a diphenylamine-linked chiral bis(oxazoline) ligand without $C_2$-symmetry of the present invention 4-bromo-2-((R)-4-phenyl-4,5-dihydrooxazol-2-yl)-N-(2-((R)-4-phenyl-4,5-dihydrooxazol-2-yl)phenyl)aniline.

3-c: $[\alpha]D^{20}$=−223 (c=1.0, $CH_2Cl_2$); $^1H$ NMR (500 MHz, Chloroform-d) δ 11.13 (s, 1H), 8.04-7.99 (m, 1H), 7.90 (dd, J=7.8, 1.5 Hz, 1H), 7.52 (dd, J=8.4, 1.1 Hz, 1H), 7.41 (d, J=2.0 Hz, 2H), 7.28-7.23 (m, 8H), 7.16-7.14 (m, 4H), 7.01-6.97 (m, 1H), 5.18 (ddd, J=10.5, 8.2, 2.8 Hz, 2H), 4.50 (dd, J=9.9, 8.5 Hz, 2H), 4.01 (dt, J=10.0, 8.2 Hz, 2H). $^{13}C$ NMR (126 MHz, Chloroform-d) δ 163.00, 142.46, 142.40, 134.27, 132.95, 131.59, 130.71, 128.56, 128.53, 127.40, 127.35, 126.62, 120.66, 119.14, 118.72, 116.73, 111.08, 73.79, 70.10; melting point: 75-78° C., HRMS: m/z calculated for $C_{30}H_{24}BrN_3O_2Na$ ([M+Na]$^+$): 538.1125; found: 538.1126.

Example 4

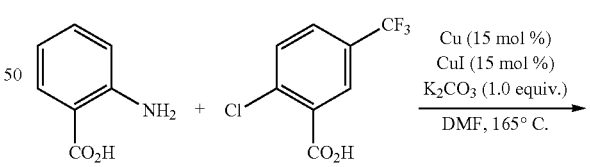

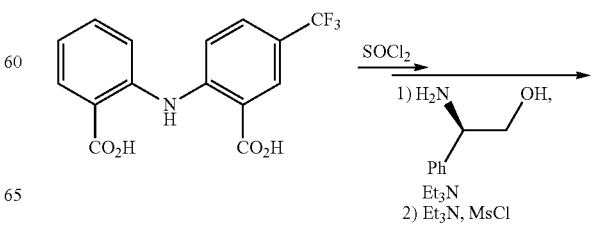

-continued

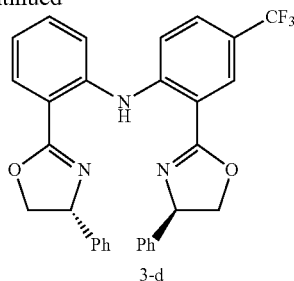

3-d 5.48 g of anthranilic acid, 8.98 g of 2-chloro-5-bromobenzoic acid, 5.52 g of $K_2CO_3$, 0.378 g of copper powder and 1.14 g of CuI were added to a round-bottom flask and mixed, then DMF was added, and the reaction was carried out at reflux temperature for 3 hours. After cooling and filtration, diluted hydrochloric acid was added to the filtrate until the solution was weakly acidic, the resulting solution was stirred and filtered by suction to obtain a solid product 2-((2-carboxyphenyl)amino)-5-trifluoromethylbenzoic acid.

1.63 g of 2-((2-carboxyphenyl)amino)-5-trifluoromethylbenzoic acid and 10 mL of $SOCl_2$ were added to a round-bottom flask and heated to reflux temperature for 4 h, excess $SOCl_2$ was removed by evaporation, thereby obtaining diacid chloride, the diacid chloride was added to dichloromethane. On ice bath, the dichloromethane solution of the diacid chloride was added dropwise to a dichloromethane solution containing 1.35 g of (R)-(−)-2-phenylglycinol and 3.8 mL of trimethylamine. The resulting solution was stirred for 20 h. The reaction was quenched with ammonium chloride solution, extracted by water, saturated sodium bicarbonate solution and saturated brine three times, respectively. The organic phase was dried over anhydrous sodium sulfate, the solvent was removed, and after purification by column chromatography, the product was used directly in the next reaction. 0.9 mL of methanesulfonyl chloride and 3.3 mL of triethylamine were added to a dichloromethane solution containing the product obtained in the previous step on ice bath. After the system was stable, the reaction was carried out at room temperature for 10 hours. The reaction was quenched by a saturated ammonium chloride solution, the resulting solution was washed with brine and dried over anhydrous sodium sulfate, the solvent was removed, thereby obtaining a crude product. The crude product was purified by column chromatography (PE/EA=10:1~5:1), thereby obtaining 2.29 g of a pale yellow solid. The product of the reaction was adiphenylamine-linked chiral bis(oxazoline) ligand without $C_2$-symmetry of the present invention 4-trifluoromethyl-2-((R)-4-phenyl-4,5-dihydrooxazol-2-yl)-N-(2-((R)-4-phenyl-4,5-dihydrooxazol-2-yl)phenyl)aniline.

3-d: $[\alpha]D^{20}$=−259 (c=1.0, $CH_2Cl_2$); $^1H$ NMR (500 MHz, $CDCl_3$) δ 11.42 (s, 1H), 8.18 (s, 1H), 7.93 (dd, J=7.8, 1.6 Hz, 1H), 7.60 (d, J=8.3 Hz, 1H), 7.52 (d, J=1.9 Hz, 2H), 7.43 (td, J=8.4, 7.9, 1.6 Hz, 1H), 7.31-7.17 (m, 9H), 7.15-7.09 (m, 3H), 5.20 (ddd, J=25.4, 10.0, 8.3 Hz, 2H), 4.52 (ddd, J=39.1, 10.1, 8.3 Hz, 2H), 4.10 (t, J=8.2 Hz, 1H), 3.98 (t, J=8.3 Hz, 1H); $^{13}C$ NMR (126 MHz, $CDCl_3$) δ 163.77, 163.21, 146.99, 142.35, 142.21, 140.92, 131.48, 130.83, 128.60, 128.51, 128.37, 128.35, 128.03, 128.00, 127.47, 127.36, 126.61, 126.58, 122.36, 121.13, 118.94, 115.43, 112.78, 74.08, 73.57, 70.23, 69.98; $^{19}F$ NMR (376 MHZ, $CDCl_3$) δ −61.64; melting point: 66-68° C., HRMS: m/z calculated for $C_{31}H_{24}F_3N_3O_2Na$ ([M+Na]$^+$): 550.1713; found: 550.1712.

Example 5

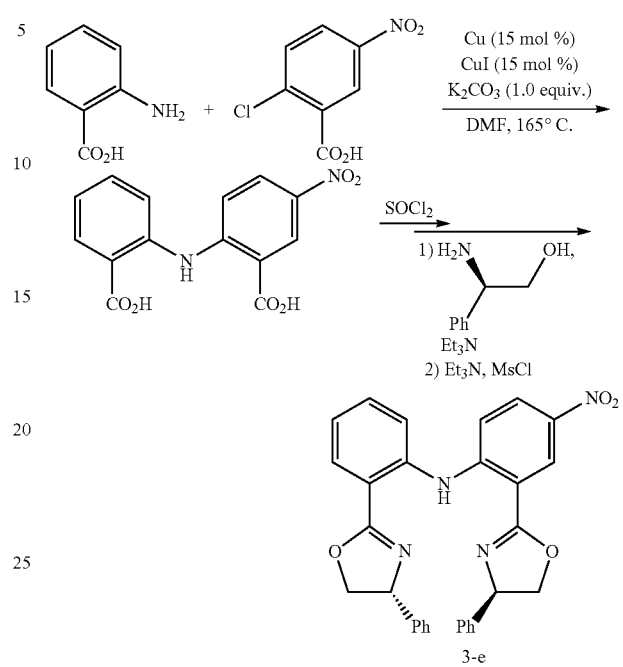

3-e 5.48 g of anthranilic acid, 8.06 g of 2-chloro-5-nitrobenzoic acid, 5.52 g of $K_2CO_3$, 0.378 g of copper powder and 1.14 g of CuI were added to a round-bottom flask and mixed, then DMF was added, and the reaction was carried out at reflux temperature for 3 hours. After cooling and filtration, diluted hydrochloric acid was added to the filtrate until the solution was weakly acidic, the resulting solution was stirred and filtered by suction to obtain a solid product 2-((2-carboxyphenyl)amino)-5-nitrobenzoic acid.

1.51 g of 2-((2-carboxyphenyl)amino)-5-nitrobenzoic acid and 10 mL of $SOCl_2$ were added to a round-bottom flask and heated to reflux temperature for 4 h, excess $SOCl_2$ was removed by evaporation, thereby obtaining diacid chloride, the diacid chloride was added to dichloromethane. On ice bath, the dichloromethane solution of the diacid chloride was added dropwise to a dichloromethane solution containing 1.35 g of (R)-(−)-2-phenylglycinol and 3.8 mL of trimethylamine. The resulting solution was stirred for 20 h. The reaction was quenched with ammonium chloride solution, extracted by water, saturated sodium bicarbonate solution and saturated brine three times, respectively. The organic phase was dried over anhydrous sodium sulfate, the solvent was removed, and after purification by column chromatography, the product was used directly in the next reaction.

0.9 mL of methanesulfonyl chloride and 3.3 mL of triethylamine were added to a dichloromethane solution containing the product obtained in the previous step on ice bath. After the system was stable, the reaction was carried out at room temperature for 10 hours. The reaction was quenched by a saturated ammonium chloride solution, the resulting solution was washed with brine and dried over anhydrous sodium sulfate, the solvent was removed, thereby obtaining a crude product. The crude product was purified by column chromatography (PE/EA=10:1-5:1), thereby obtaining 2.32 g of a yellow solid. The product of the reaction was adiphenylamine-linked chiral bis(oxazoline) ligand without $C_2$-symmetry of the present invention 4-nitro-2-((R)-4-phenyl-4,5-dihydrooxazol-2-yl)-N-(2-((R)-4-phenyl-4,5-dihydrooxazol-2-yl)phenyl)aniline.

3-e: $[\alpha]D^{20}=-139$ (c=1.0, $CH_2Cl_2$); $^1H$ NMR (500 MHz, $CDCl_3$) δ 11.80 (s, 1H), 8.83 (d, J=2.8 Hz, 1H), 8.14 (dd, J=9.4, 2.8 Hz, 1H), 7.96 (dd, J=7.8, 1.5 Hz, 1H), 7.61-7.55 (m, 1H), 7.50 (td, J=8.2, 7.8, 1.6 Hz, 1H), 7.32 (d, J=9.4 Hz, 1H), 7.28-7.25 (m, 8H), 7.20 (dd, J=7.6, 1.7 Hz; 2H), 7.10 (dd, J=6.5, 3.0 Hz, 2H), 5.19 (ddd, J=27.0, 10.0, 8.3 Hz, 2H), 4.60 (dd, J=10.1, 8.4 Hz, 1H), 4.48 (dd, J=10.2, 8.4 Hz, 1H), 4.17 (t, J=8.3 Hz, 1H), 3.97 (t, J=8.3 Hz, 1H); $^{13}C$ NMR (126 MHz, $CDCl_3$) δ 162.75, 144.95, 141.89, 141.07, 131.94, 131.62, 130.91, 128.65, 128.54, 127.56, 127.40, 126.58, 122.26, 119.76; melting point: 153-156° C., HRMS: m/z calculated for $C_{30}H_{24}N_4O_4Na$ ([M+Na]$^+$): 527.1690; found: 527.1691.

Example 6

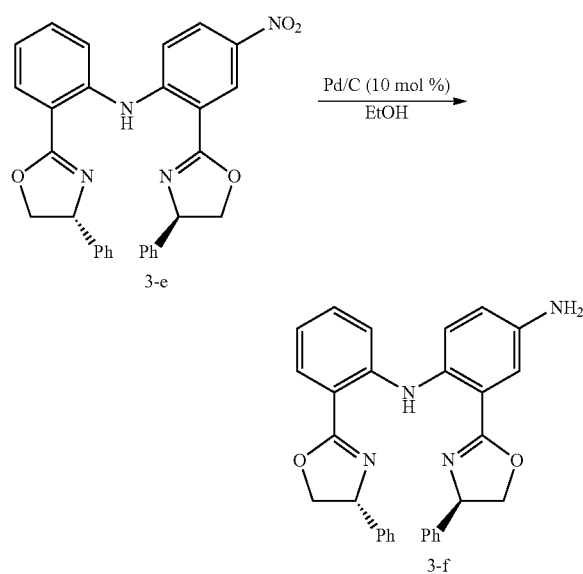

0.18 g of 10% Pd/C, 0.50 g of 4-nitro-2-((R)-4-phenyl-4,5-dihydrooxazol-2-yl)-N-(2-((R)-4-phenyl-4,5-dihydrooxazol-2-yl)phenyl)aniline and anhydrous ethanol were added to a reaction kettle, the air in the kettle was replaced with $N_2$ for three times, and then the $N_2$ in the kettle was replaced with $H_2$ for three times, and $H_2$ (2.5 MPa) was pumped into to start the reaction. After the end of the reaction, the reaction solution was taken out, filtered with diatomaceous earth, and the solvent was removed. Column chromatography separation (PE/EA=20:1~10:1) was carried out, thereby obtaining 0.39 g of yellow product. The product of the reaction was a diphenylamine-linked chiral bis(oxazoline) ligand without $C_2$-symmetry of the present invention 4-amino-2-((R)-4-phenyl-4,5-dihydrooxazol-2-yl)-N-(2-((R)-4-phenyl-4,5-dihydrooxazol-2-yl)phenyl)aniline.

3-f: $[\alpha]D^{20}=-233$ (c=1.0, $CH_2Cl_2$); $^1H$ NMR (500 MHz, Chloroform-d) δ 10.60 (s, 1H), 7.86 (dd, J=7.9, 1.5 Hz, 1H), 7.37 (d, J=8.6 Hz, 1H), 7.28 (s, 7H), 7.26 (d, J=2.9 Hz, 2H), 7.24 (d, J=3.0 Hz, 1H), 7.23 (s, 1H), 7.19 (d, J=8.5 Hz, 1H), 7.10 (dd, J=7.3, 1.9 Hz, 2H), 6.83-6.75 (m, 2H), 5.29 (dd, J=9.9, 8.0 Hz, 1H), 5.13 (dd, J=9.9, 8.4 Hz, 1H), 4.57 (dd, J=10.0, 8.3 Hz, 1H), 4.41 (dd, J=10.1, 8.4 Hz, 1H), 4.09 (t, J=8.1 Hz, 1H), 3.90 (t, J=8.3 Hz, 1H). $^{13}C$ NMR (126 MHz, Chloroform-d) δ 163.28, 162.82, 150.61, 146.29, 142.82, 142.24, 141.48, 131.94, 130.31, 128.54, 128.51, 127.33, 127.30, 126.70, 124.65, 119.80, 118.93, 117.71, 114.42, 110.56, 73.22, 70.14; melting point: 85-89° C., HRMS: m/z calculated for $C_{30}H_{26}N_4O_2Na$ ([M+Na]$^+$): 475.2129; found: 475.2128.

Example 7

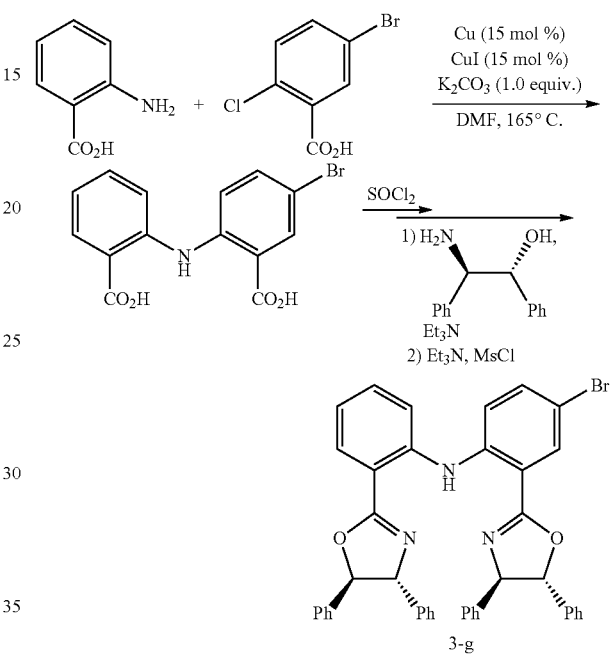

5.48 g of anthranilic acid, 9.42 g of 2-chloro-5-bromobenzoic acid, 5.52 g of $K_2CO_3$, 0.378 g of copper powder and 1.14 g of CuI were added to a round-bottom flask and mixed, then DMF, was added, and the reaction was carried out at reflux temperature for 3 hours. After cooling and filtration, diluted hydrochloric acid was added to the filtrate until the solution was weakly acidic, the resulting solution was stirred and filtered by suction to obtain a solid product 2-((2-carboxyphenyl)amino)-5-bromobenzoic acid.

1.68 g of 2-((2-carboxyphenyl)amino)-5-bromobenzoic acid and 10 mL of $SOCl_2$ were added to a round-bottom flask and heated to reflux temperature for 4 h, excess $SOCl_2$ was removed by evaporation, thereby obtaining diacid chloride, the diacid chloride was added to dichloromethane. On ice bath, the dichloromethane solution of the diacid chloride was added dropwise to a dichloromethane solution containing 2.13 g of (1R, 2S)-2-amino-1,2-diphenylethanol and 3.8 mL of trimethylamine. The resulting solution was stirred for 20 h. The reaction was quenched with ammonium chloride solution, extracted by water, saturated sodium bicarbonate solution and saturated brine three times, respectively. The organic phase was dried over anhydrous sodium sulfate, the solvent was removed, and after purification by column chromatography, the product was used directly in the next reaction.

0.9 mL of methanesulfonyl chloride and 3.3 mL of triethylamine were added to a dichloromethane solution containing the product obtained in the previous step on ice bath. After the system was stable, the reaction was carried out at room temperature for 10 hours. The reaction was quenched by a saturated ammonium chloride solution, the resulting solution was washed with brine and dried over anhydrous sodium sulfate, the solvent was removed, thereby obtaining a crude product. The crude product was purified by column chromatography (PE/EA=10:1~5:1), thereby obtaining 2.15 g of a yellow solid. The product of the reaction was adiphenylamine-linked chiral bis(oxazoline) ligand without $C_2$-symmetry of the present invention 4-bromo-2-((4R,5R)-4-phenyl-4,5-dihydrooxazol-2-yl)-N-(2-((4R,5R)-4-phenyl-4,5-dihydrooxazol-2-yl)phenyl)aniline.

3-g: $[\alpha]D^{20}=-73$ (c=1.0, $CH_2Cl_2$); $^1$H NMR (500 MHz, $CDCl_3$) δ 11.34 (s, 1H), 8.09 (dd, J=1.8, 0.8 Hz, 1H), 8.01 (d, J=7.4 Hz, 1H), 7.59 (d, J=8.4 Hz, 1H), 7.47 (d, J=1.8 Hz, 2H), 7.45-7.41 (m, 1H), 7.33 (td, J=4.6, 1.4 Hz, 6H), 7.18 (qd, J=6.8, 3.0 Hz, 11H), 7.05 (ddd, J=7.7, 5.4, 1.8 Hz, 5H), 5.14-5.11 (m, 2H), 4.94 (dd, J=12.9, 7.7 Hz, 2H). $^{13}$C NMR (126 MHz, Chloroform-d) δ 162.19, 143.05, 140.30, 132.96, 131.79, 130.89, 128.79, 128.76, 128.57, 128.38, 128.30, 127.40, 126.41, 126.38, 125.87, 125.77, 119.37, 119.28, 111.10, 88.00, 78.71; melting point: 86-89° C., HRMS: m/z calculated for $C_{42}H_{32}BrN_3O_2Na$ ([M+Na]$^+$): 690.1750; found: 690.1749.

Example 8

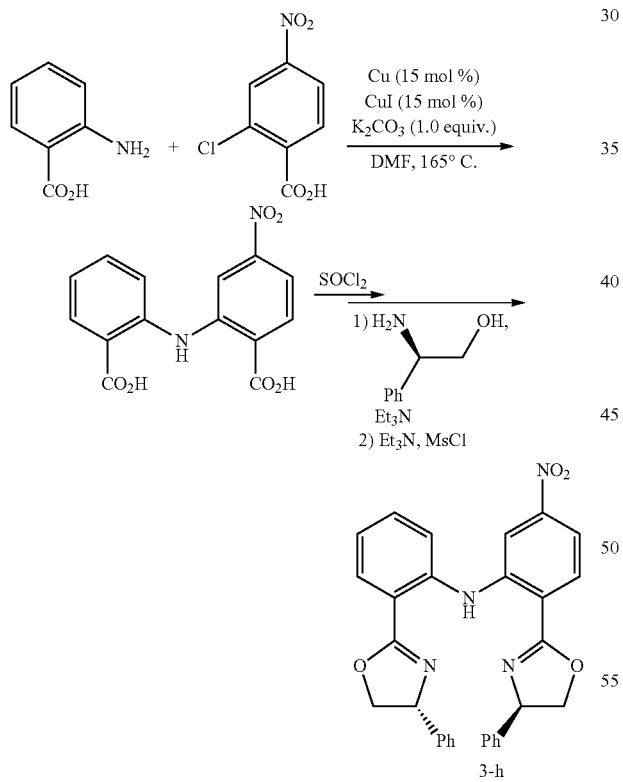

5.48 g of anthranilic acid, 8.06 g of 2-chloro-4-nitrobenzoic acid, 5.52 g of $K_2CO_3$, 0.378 g of copper powder and 1.14 g of CuI were added to a round-bottom flask and mixed, then DMF was added, and the reaction was carried out at reflux temperature for 3 hours. After cooling and filtration, diluted hydrochloric acid was added to the filtrate until the solution was weakly acidic, the resulting solution was stirred and filtered by suction to obtain a solid product 2-((2-carboxyphenyl)amino)-4-nitrobenzoic acid.

1.51 g of 2-((2-carboxyphenyl)amino)-4-nitrobenzoic acid and 10 mL of $SOCl_2$ were added to a round-bottom flask and heated to reflux temperature for 4 h, excess $SOCl_2$ was removed by evaporation, thereby obtaining diacid chloride, the diacid chloride was added to dichloromethane. On ice bath, the dichloromethane solution of the diacid chloride was added dropwise to a dichloromethane solution containing 1.35 g of (R)-(-)-2-phenylglycinol and 3.8 mL of trimethylamine. The resulting solution was stirred for 20 h. The reaction was quenched with ammonium chloride solution, extracted by water, saturated sodium bicarbonate solution and saturated brine three times, respectively. The organic phase was dried over anhydrous sodium sulfate, the solvent was removed, and after purification by column chromatography, the product was used directly in the next reaction.

0.9 mL of methanesulfonyl chloride and 3.3 mL of triethylamine were added to a dichloromethane solution containing the product obtained in the previous step on ice bath. After the system was stable, the reaction was carried out at room temperature for 10 hours. The reaction was quenched by a saturated ammonium chloride solution, the resulting solution was washed with brine and dried over anhydrous sodium sulfate, the solvent was removed, thereby obtaining a crude product. The crude product was purified by column chromatography (PE/EA=10:1~5:1), thereby obtaining 2.07 g of an orange solid. The product of the reaction was a diphenylamine-linked chiral bis(oxazoline) ligand without $C_2$-symmetry of the present invention 5-nitro-2-((R)-4-phenyl-4,5-dihydrooxazol-2-yl)-N-(2-((R)-4-phenyl-4,5-dihydrooxazol-2-yl)phenyl)aniline.

3-h: $[\alpha]D^{20}=-358$ (c=1.0, $CH_2Cl_2$); $^1$H NMR (500 MHz, $CDCl_3$) δ 11.48 (s, 1H), 8.34 (s, 1H), 8.02 (d, J=8.6 Hz, 1H), 7.95 (dd, J=7.9, 1.6 Hz, 1H), 7.65 (dd, J=8.6, 2.2 Hz, 1H), 7.63-7.58 (m, 1H), 7.47 (ddd, J 8.4, 7.4, 1.6 Hz, 1H), 7.29-7.23 (m, 8H), 7.18-7.12 (m, 4H), 5.18 (ddd, J=10.1, 8.2, 5.2 Hz, 2H), 4.52 (dt, J=10.1, 8.3 Hz, 2H), 4.05 (dt, J=38.5, 8.3 Hz, 2H); $^{13}$C NMR (126 MHz, $CDCl_3$) δ 163.68, 141.05, 131.92, 131.61, 130.89, 128.65, 128.53, 127.56, 127.39, 126.58, 122.24, 119.75, 118.65, 112.62, 110.75, 73.97, 73.77, 70.28, 70.03; melting point: 76-78° C., HRMS: m/z calculated for $C_{30}H_{24}N_4O_4Na$ ([M+Na]$^+$): 527.1690; found: 527.1684.

Example 9

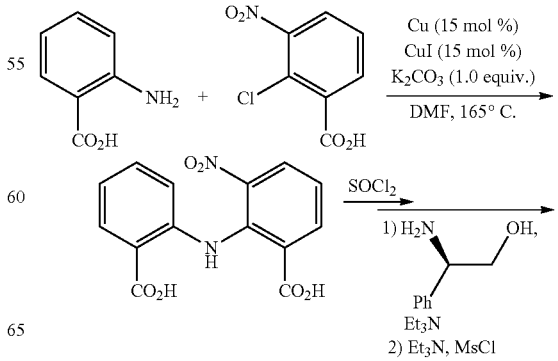

-continued

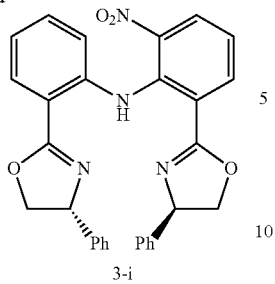

3-i 5.48 g of anthranilic acid, 8.06 g of 2-chloro-3-nitrobenzoic acid, 5.52 g of $K_2CO_3$, 0.378 g of copper powder and 1.14 g of CuI were added to a round-bottom flask and mixed, then DMF was added, and the reaction was, carried out at reflux temperature for 3 hours. After cooling and filtration, diluted hydrochloric acid was added to the filtrate until the solution was weakly acidic, the resulting solution was stirred and filtered by suction to obtain a solid product 2-((2-carboxyphenyl)amino)-3-nitrobenzoic acid.

1.51 g of 2-((2-carboxyphenyl)amino)-3-nitrobenzoic acid and 10 mL of $SOCl_2$ were added to a round-bottom flask and heated to reflux temperature for 4 h, excess $SOCl_2$ was removed by evaporation, thereby obtaining diacid chloride, the diacid chloride was added to dichloromethane. On ice bath, the dichloromethane solution of the diacid chloride was added dropwise to a dichloromethane solution containing 1.35 g of (R)-(–)-2-phenylglycinol and 3.8 mL of trimethylamine. The resulting solution was stirred for 20 h. The reaction was quenched with ammonium chloride solution, extracted by water, saturated sodium bicarbonate solution and saturated brine three times, respectively. The organic phase was dried over anhydrous sodium sulfate, the solvent was removed, and after purification by column chromatography, the product was used directly in the next reaction.

0.9 mL of methanesulfonyl chloride and 3.3 mL of triethylamine were added to a dichloromethane solution containing the product obtained in the previous step on ice bath. After the system was stable, the reaction was carried out at room temperature for 10 hours. The reaction was quenched by a saturated ammonium chloride solution, the resulting solution was washed with brine and dried over anhydrous sodium sulfate, the solvent was removed, thereby obtaining a crude product. The crude product was purified by column chromatography (PE/EA=10:1~5:1), thereby obtaining 1.69 g of an orange solid. The product of the reaction was a diphenylamine-linked chiral bis(oxazoline) ligand without $C_2$-symmetry of the present invention 2-nitro-2-((R)-4-phenyl-4,5-dihydrooxazol-2-yl)-N-(2-((R)-4-phenyl-4,5-dihydrooxazol-2-yl)phenyl)aniline.

3-i: $[\alpha]D^{20}=-142$ (c=1.0, $CH_2Cl_2$); $^1$H NMR (500 MHz, Chloroform-d) δ 11.55 (d, J=72.1 Hz, 1H), 8.13-8.10 (m, 1H), 7.92 (d, J=7.4 Hz, 1H), 7.47-7.34 (m, 2H), 7.28 (s, 8H), 7.18-7.07 (m, 3H), 6.98-6.84 (m, 2H), 5.47 (s, 1H), 5.07 (s, 1H), 4.69 (d, J=44.5 Hz, 1H), 4.47 (s, 1H), 4.18 (t, J=8.1 Hz, 1H), 3.97 (s, 1H), 3.68 (s, 1H). $^{13}$C NMR (126 MHz, Chloroform-d) 5164.11, 164.08, 143.58, 139.90, 136.10, 131.87, 130.17, 128.60, 128.57, 127.52, 127.37, 126.58, 126.53, 124.37, 124.33, 123.26, 121.26, 120.12, 114.16, 113.71, 74.47, 74.46, 70.06, 70.03; melting point: 115-118° C., HRMS: m/z calculated for $C_{30}H_{24}N_4O_4Na$ ([M+Na]$^+$): 527.1690; found: 527.1684.

Example 10

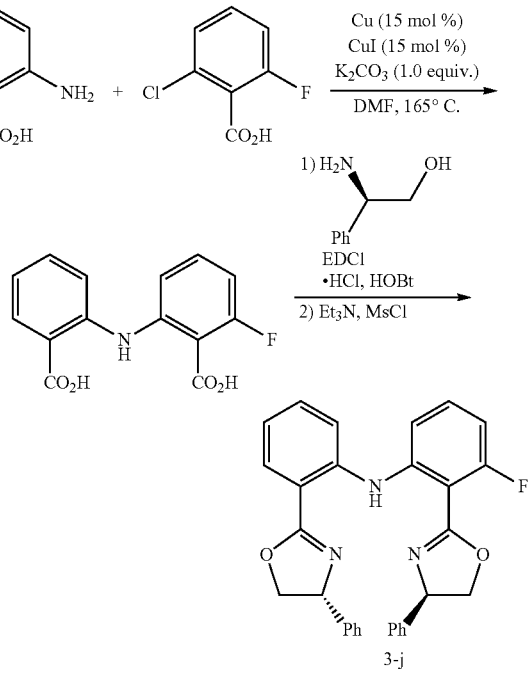

3-j 5.48 g of anthranilic acid, 6.98 g of 2-chloro-6-fluorobenzoic acid, 5.52 g of $K_2CO_3$, 0.378 g of copper powder and 1.14 g of CuI were added to a round-bottom flask and mixed, then DMF was added, and the reaction was carried out at reflux temperature for 3 hours. After cooling and filtration, diluted hydrochloric acid was added to the filtrate until the solution was weakly acidic, the resulting solution was stirred and filtered by suction to obtain a solid product 2-((2-carboxyphenyl)amino)-6-fluorobenzoic acid.

1.35 g of (R)-(–)-2-phenylglycinol, 2.20 g of 1-(3-dimethylaminopropyl)-3-ethylcarbodiimide hydrochloride and 1.55 g of 1-hydroxybenzotriazole were dissolved in THF, and then 1.10 g of 2-((2-carboxyphenyl)amino)-6-fluorobenzoic acid was added. The reaction was carried out at room temperature for 12 hours. The reaction was quenched with ammonium chloride solution, the solvent was removed under reduced pressure, and the crude product was dissolved in ethyl acetate, washed with water, and extracted three times. The organic phase was dried over sodium sulfate, the solvent was removed, and after purification by column chromatography, the product was used directly in the next reaction.

0.9 mL of methanesulfonyl chloride and 3.3 mL of triethylamine were added to a dichloromethane solution containing the product obtained in the previous step on ice bath. After the system was stable, the reaction was carried out at room temperature for 10 hours. The reaction was quenched by a saturated ammonium chloride solution, the resulting solution was washed with brine and dried over anhydrous sodium sulfate, the solvent was removed, thereby obtaining a crude product. The crude product was purified by column chromatography (PE/EA=10:1~5:1), thereby obtaining 1.29 g of a pale yellow solid. The product of the reaction was a diphenylamine-linked chiral bis(oxazoline) ligand without $C_2$-symmetry of the present invention 3-fluoro-2-((R)-4-phenyl-4,5-dihydrooxazol-2-yl)-N-(2-((R)-4-phenyl-4,5-dihydrooxazol-2-yl)phenyl)aniline.

3-j: $[\alpha]D^{20}$=−298 (c=1.0, $CH_2Cl_2$); $^1$H NMR (500 MHz, $CDCl_3$) δ 10.92 (s, 1H), 7.86 (d, J=6.8 Hz, 1H), 7.52 (ddd, J=32.5, 9.2, 3.9 Hz, 2H), 7.42-6.99 (m, 14H), 6.88 (t, J=7.3 Hz, 1H), 5.16 (q, J=10.3 Hz, 2H), 4.47 (ddd, J=13.3, 10.0, 8.5 Hz, 2H), 3.98 (dt, J=17.0, 8.2 Hz, 3H); $^{13}$C NMR (126 MHz, $CDCl_3$) δ 164.10, 163.16, 142.52, 142.19, 131.68, 130.53, 128.48, 127.29, 126.56, 121.02, 120.94, 119.27, 118.71, 118.49, 116.67, 116.43, 113.84, 73.98, 73.54, 70.00; $^{19}$F NMR (376 MHZ, $CDCl_3$) δ −122.68; melting point: 68-71° C.; HRMS: m/z calculated for $C_{30}H_{24}FN_3O_2Na$ ([M+Na]$^+$):500.1745; found: 500.1739.

Example 11

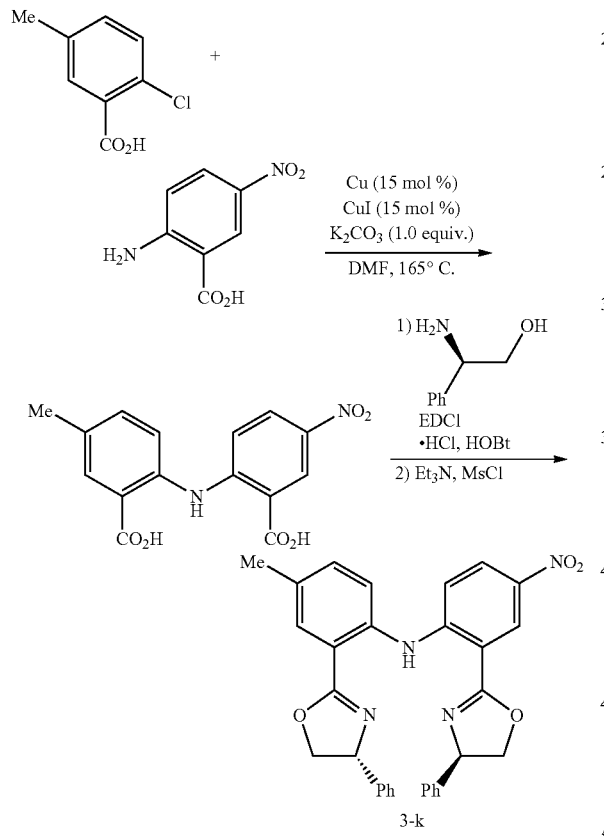

7.28 g of 2-amino-5-nitrobenzoic acid, 6.82 g of 2-chloro-5-methylbenzoic acid, 5.52 g of $K_2CO_3$, 0.378 g of copper powder and 1.14 g of CuI were added to a round-bottom flask and mixed, then DMF was added, and the reaction was carried out at reflux temperature for 3 hours. After cooling and filtration, diluted hydrochloric acid was added to the filtrate until the solution was weakly acidic, the resulting solution was stirred and filtered by suction to obtain a solid product 2-((2-carboxy-4-methylphenyl)amino)-5-nitrobenzoic acid.

1.35 g of (R)-(−)-2-phenylglycinol, 2.20 g of 1-(3-dimethylaminopropyl)-3-ethylcarbodiimide hydrochloride and 1.55 g of 1-hydroxybenzotriazole were dissolved in THF, and then 1.58 g of 2-((2-carboxy-4-methylphenyl)amino)-5-nitrobenzoic acid was added. The reaction was carried out at room temperature for 12 hours. The reaction was quenched with ammonium chloride solution, the solvent was removed under reduced pressure, and the crude product was dissolved in ethyl acetate, washed with water, and extracted three times. The organic phase was dried over sodium sulfate, the solvent was removed, and after purification by column chromatography, the product was used directly in the next reaction.

0.9 mL of methanesulfonyl chloride and 3.3 mL of triethylamine were added to a dichloromethane solution containing the product obtained in the previous step on ice bath. After the system was stable, the reaction was carried out at room temperature for 10 hours. The reaction was quenched by a saturated ammonium chloride solution, the resulting solution was washed with brine and dried over anhydrous sodium sulfate, the solvent was removed, thereby obtaining a crude product. The crude product was purified by column chromatography (PE/EA=10:1~5:1), thereby obtaining 2.07 g of a yellow solid. The product of the reaction was a diphenylamine-linked chiral bis(oxazoline) ligand without $C_2$-symmetry of the present invention 4-methyl-N-(4-nitro-2-((R)-4-phenyl-4,5-dihydrooxazol-2-yl)phenyl)-2-((R)-4-phenyl-4,5-dihydrooxazol-2-yl)aniline.

3-k: $[\alpha]D^{20}$=−169 (c=1.0, $CH_2Cl_2$); $^1$H NMR (500 MHz, Chloroform-d) δ 11.63 (s, 1H), 8.82 (d, J=2.6 Hz, 1H), 8.11 (dd, J=9.4, 2.6 Hz, 1H), 7.79 (s, 1H), 7.44 (d, J=8.2 Hz, 1H), 7.31-7.20 (m, 11H), 7.12-7.08 (m, 2H), 5.26 (t, J=9.1 Hz, 1H), 5.16 (t, J=9.2 Hz, 1H), 4.66-4.59 (m, 1H), 4.49-4.42 (m, 1H), 4.18 (t, J=8.2 Hz, 1H), 3.95 (t, J=8.3 Hz, 1H), 2.40 (s, 3H). $^{13}$C NMR (126 MHz, Chloroform-d) δ 163.56, 162.97, 150.73, 142.12, 141.95, 137.75, 136.40, 132.44, 132.44, 131.40, 128.71, 128.56, 127.65, 127.52, 127.48, 127.40, 126.59, 126.52, 124.31, 121.61, 113.22, 110.31, 74.42, 73.45, 70.36, 69.87, 20.76; melting point: 85-86° C.; HRMS: m/z calculated for $C_{31}H_{26}N_4O_4Na$ ([M+Na]$^+$): 541.1846; found: 541.1847.

Example 12

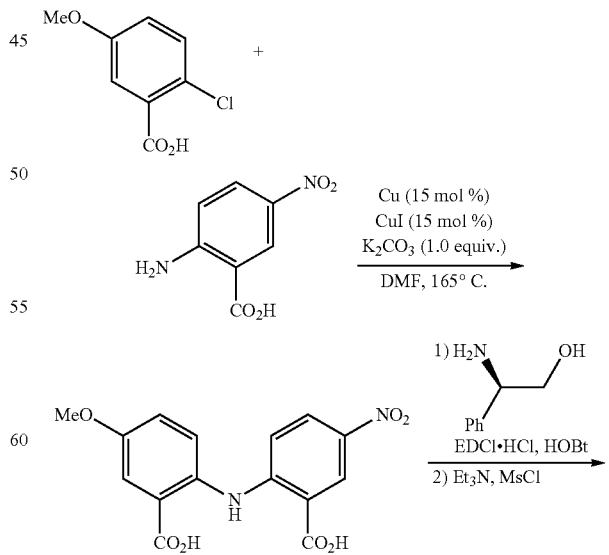

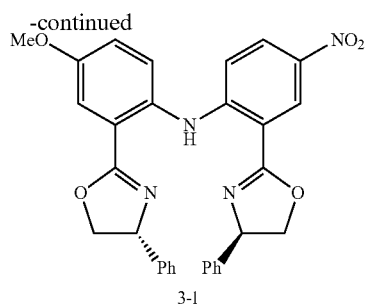

3-1

7.28 g of 2-amino-5-nitrobenzoic acid, 7.46 g of 2-chloro-5-methoxybenzoic acid, 5.52 g of $K_2CO_3$, 0.378 g of copper powder and 1.14 g of CuI were added to a round-bottom flask and mixed, then DMF was added, and the reaction was carried out at reflux temperature for 3 hours. After cooling and filtration, diluted hydrochloric acid was added to the filtrate until the solution was weakly acidic, the resulting solution was stirred and filtered by suction to obtain a solid product 2-((2-carboxy-4-methoxyphenyl)amino)-5-nitrobenzoic acid.

1.35 g of (R)-(−)-2-phenylglycinol, 2.20 g of 1-(3-dimethylaminopropyl)-3-ethylcarbodiimide hydrochloride and 1.55 g of 1-hydroxybenzotriazole were dissolved in THF, and then 1.66 g of 2-((2-carboxy-4-methoxyphenyl)amino)-5-nitrobenzoic acid was added. The reaction was carried out at room temperature for 12 hours. The reaction was quenched with ammonium chloride solution, the solvent was removed under reduced pressure, and the crude product was dissolved in ethyl acetate, washed with water, and extracted three times. The organic phase was dried over sodium sulfate, the solvent was removed, and after purification by column chromatography, the product was used directly in the next reaction.

0.9 mL of methanesulfonyl chloride and 3.3 mL of triethylamine were added to a dichloromethane solution containing the product obtained in the previous step on ice bath. After the system was stable, the reaction was carried out at room temperature for 10 hours. The reaction was quenched by a saturated ammonium chloride solution, the resulting solution was washed with brine and dried over anhydrous sodium sulfate, the solvent was removed, thereby obtaining a crude product. The crude product was purified by column chromatography (PE/EA=10:1~5:1), thereby obtaining 1.98 g of an orange solid. The product of the reaction was a diphenylamine-linked chiral bis(oxazoline) ligand without $C_2$-symmetry of the present invention 4-methoxy-N-(4-nitro-2-((R)-4-phenyl-4,5-dihydrooxazol-2-yl)phenyl)-2-((R)-4-phenyl-4,5-dihydrooxazol-2-yl)aniline.

3-1: $[\alpha]_D^{20}$=−121 (c=1.0, $CH_2Cl_2$); $^1$H NMR (500 MHz, Chloroform-d) δ 11.47 (s, 1H), 8.82 (s, 1H), 8.10 (d, J=12.2 Hz, 1H), 7.48 (d, J=3.0 Hz, 1H), 7.42 (d, J=8.9 Hz, 1H), 7.29-7.23 (m, 9H), 7.10-7.07 (m, 3H), 7.02 (d, J=9.4 Hz, 1H), 5.28 (dd, J=9.9, 8.3 Hz, 1H), 5.18 (dd, J=10.0, 8.4 Hz, 1H), 4.63 (dd, J=10.0, 8.4 Hz, 1H), 4.48 (dd, J=10.1, 8.5 Hz, 1H), 4.19 (t, J=8.2 Hz, 1H), 3.95 (t, J=8.4 Hz, 1H), 3.88 (s, 3H). $^{13}$C NMR (126 MHz, Chloroform-d) δ 163.28, 163.14, 156.99, 151.50, 141.97, 137.41, 131.65, 128.72, 128.58, 127.67, 127.53, 127.44, 127.02, 126.59, 126.51, 123.91, 118.44, 114.96, 112.62, 109.54, 74.55, 73.39, 70.34, 69.95, 55.79; melting point: 80-81° C.; HRMS: m/z calculated for $C_{31}H_{26}N_4OSNa$ ([M+Na]$^+$): 557.1795; found: 557.1793.

Example 13

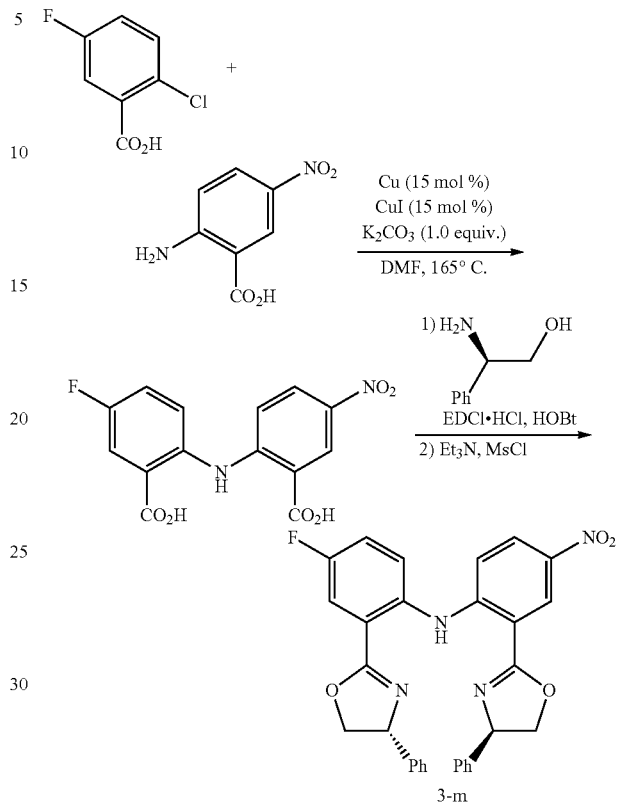

3-m 7.28 g of 2-amino-5-nitrobenzoic acid, 6.98 g of 2-chloro-5-fluorobenzoic acid, 5.52 g of $K_2CO_3$, 0.378 g of copper powder and 1.14 g of CuI were added to a round-bottom flask and mixed, then DMF was added, and the reaction was carried out at reflux temperature for 3 hours. After cooling and filtration, diluted hydrochloric acid was added to the filtrate until the solution was weakly acidic, the resulting solution was stirred and filtered by suction to obtain a solid product 2-((2-carboxy-4-fluorophenyl)amino)-5-nitrobenzoic acid.

1.35 g of (R)-(−)-2-phenylglycinol, 2.20 g of 1-(3-dimethylaminopropyl)-3-ethylcarbodiimide hydrochloride and 1.55 g of 1-hydroxybenzotriazole were dissolved in THF, and then 1.66 g of 2-((2-carboxy-4-fluorophenyl)amino)-5-nitrobenzoic acid was added. The reaction was carried out at room temperature for 12 hours. The reaction was quenched with ammonium chloride solution, the solvent was removed under reduced pressure, and the crude product was dissolved in ethyl acetate, washed with water, and extracted three times. The organic phase was dried over sodium sulfate, the solvent was removed, and after purification by column chromatography, the product was used directly in the next reaction.

0.9 mL of methanesulfonyl chloride and 3.3 mL of triethylamine were added to a dichloromethane solution containing the product obtained in the previous step on ice bath. After the system was stable, the reaction was carried out at room temperature for 10 hours. The reaction was quenched by a saturated ammonium chloride solution, the resulting solution was washed with brine and dried over anhydrous sodium sulfate, the solvent was removed, thereby obtaining a crude product. The crude product was purified by column chromatography (PE/EA=10:1~5:1), thereby obtaining 1.85 g of a yellow solid. The product of the reaction was a diphenylamine-linked chiral bis(oxazoline) ligand without $C_2$-symmetry of the present invention 4-fluoro-N-(4-nitro-2-((R)-4-phenyl-4,5-dihydrooxazol-2-yl)phenyl)-2-((R)-4-phenyl-4,5-dihydrooxazol-2-yl)aniline.

3-m: $[\alpha]D^{20}$=−149 (c=1.0, $CH_2Cl_2$); $^1$H NMR (500 MHz, Chloroform-d) δ 11.65 (s, 1H), 8.83 (d, J=2.7 Hz, 1H), 8.13 (dd, J=9.4, 2.7 Hz, 1H), 7.67 (dd, J=8.9, 3.0 Hz, 1H), 7.52 (dd, J=8.9, 4.9 Hz, 1H), 7.27 (dt, J=6.3, 4.0 Hz, 7H), 7.23-7.18 (m, 3H), 7.15 (d, J=9.4 Hz, 1H), 7.10-7.06 (m, 2H), 5.21 (ddd, J=27.6, 10.0, 8.4 Hz, 2H), 4.62 (dd, J=10.0, 8.4 Hz, 1H), 4.50 (dd, J=10.2, 8.5 Hz, 1H), 4.18 (t, J=8.2 Hz, 1H), 3.98 (t, J=8.4 Hz, 1H). $^{13}$C NMR (126 MHz, Chloroform-d) δ 162.87, 162.24, 160.09, 156.14, 150.57, 141.82, 138.02, 135.17, 128.71, 128.59, 127.68, 127.58, 127.56, 127.37, 126.56, 126.44, 126.22, 126.16, 123.49, 123.43, 118.86, 118.68, 117.63, 117.43, 112.98, 110.55, 74.48, 73.49, 70.32, 70.05. $^{19}$F NMR (376 MHZ, $CDCl_3$) δ −122.69; melting point: 85-86° C.; HRMS: m/z calculated for $C_{30}H_{23}FN_4O_4Na$ ([M+Na]$^+$): 545.1596; found: 545.1598.

Example 14

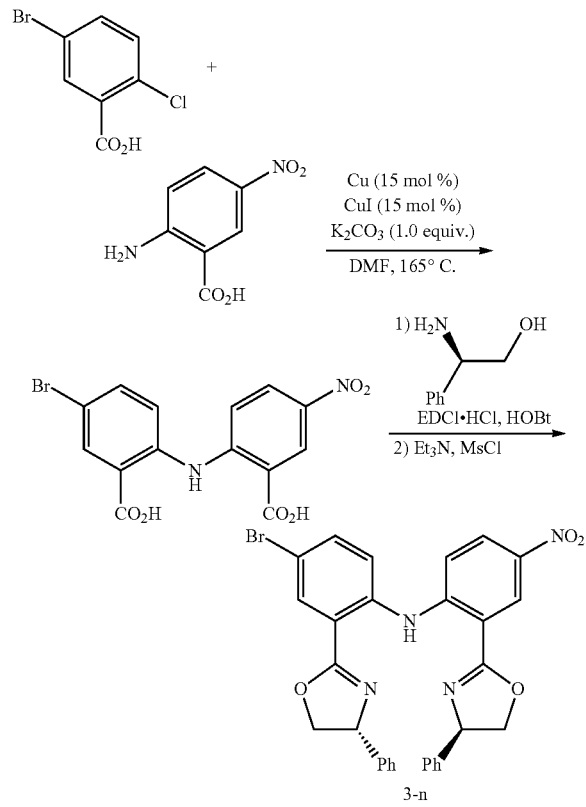

7.28 g of 2-amino-5-nitrobenzoic acid, 9.42 g of 2-chloro-5-bromobenzoic acid, 5.52 g of $K_2CO_3$, 0.378 g of copper powder and 1.14 g of CuI were added to a round-bottom flask and mixed, then DMF was added, and the reaction was carried out at reflux temperature for 3 hours. After cooling and filtration, diluted hydrochloric acid was added to the filtrate until the solution was weakly acidic, the resulting solution was stirred and filtered by suction to obtain a solid product 2-((2-carboxy-4-bromophenyl)amino)-5-nitrobenzoic acid.

1.35 g of (R)-(−)-2-phenylglycinol, 2.20 g of 1-(3-dimethylaminopropyl)-3-ethylcarbodiimide hydrochloride and 1.55 g of 1-hydroxybenzotriazole were dissolved in THF, and then 1.66 g of 2-((2-carboxy-4-bromophenyl)amino)-5-nitrobenzoic acid was added. The reaction was carried out at room temperature for 12 hours. The reaction was quenched with ammonium chloride solution, the solvent was removed under reduced pressure, and the crude product was dissolved in ethyl acetate, washed with water, and extracted three times. The organic phase was dried over sodium sulfate, the solvent was removed, and after purification by column chromatography, the product was used directly in the next reaction.

0.9 mL of methanesulfonyl chloride and 3.3 mL of triethylamine were added to a dichloromethane solution containing the product obtained in the previous step on ice bath. After the system was stable, the reaction was carried out at room temperature for 10 hours. The reaction was quenched by a saturated ammonium chloride solution, the resulting solution was washed with brine and dried over anhydrous sodium sulfate, the solvent was removed, thereby obtaining a crude product. The crude product was purified by column chromatography (PE/EA=10:1~5:1), thereby obtaining 2.47 g of a yellow solid. The product of the reaction was a diphenylamine-linked chiral bis(oxazoline) ligand without $C_2$-symmetry of the present invention 4-bromo-N-(4-nitro-2-((R)-4-phenyl-4,5-dihydrooxazol-2-yl)phenyl)-2-((R)-4-phenyl-4,5-dihydrooxazol-2-yl)aniline.

3-n: $[\alpha]D^{20}$=−149 (c=1.0, $CH_2Cl_2$); $^1$H NMR (500 MHz, Chloroform-d) δ 11.82 (s, 1H), 8.82 (d, J=2.7 Hz, 1H), 8.15 (dd, J=9.4, 2.8 Hz, 1H), 8.10 (d, J=2.4 Hz, 1H), 7.58 (dd, J=8.7, 2.4 Hz, 1H), 7.46 (d, J=8.7 Hz, 1H), 7.32 (d, J=9.4 Hz, 1H), 7.27 (dt, J=7.0, 2.9 Hz, 7H), 7.18 (dd, J=7.5, 1.7 Hz, 2H), 7.09 (dd, J=6.5, 3.0 Hz, 2H), 5.18 (ddd, J=26.5, 10.0, 8.4 Hz, 2H), 4.61 (dd, J=10.0, 8.4 Hz, 1H), 4.49 (dd, J=10.1, 8.4 Hz, 1H), 4.16 (t, J=8.3 Hz, 1H), 3.99 (t, J=8.4 Hz, 1H). $^{13}$C NMR (126 MHz, Chloroform-d) δ 162.65, 162.12, 149.47, 141.85, 138.64, 134.46, 133.64, 128.71, 128.61, 127.67, 127.56, 127.39, 127.30, 126.55, 126.46, 124.35, 122.18, 116.44, 114.01, 111.81, 74.38, 73.61, 70.35, 70.06; melting point: 87-89° C.; HRMS: m/z calculated for $C_{30}H_{23}BrN_4O_4Na$ ([M+Na]$^+$): 605.0795; found: 605.0794.

Example 15

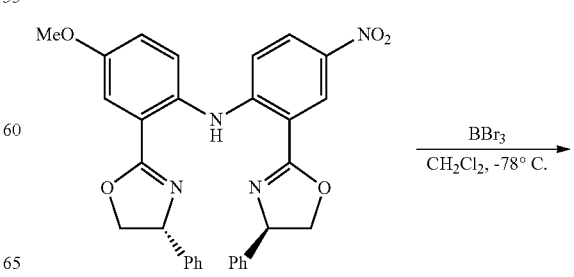

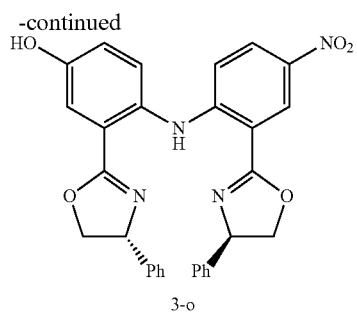

3-o

Under N$_2$, 0.53 g of 4-methoxy-N-(4-nitro-2-((R)-4-phenyl-4,5-dihydrooxazole-2-yl)phenyl)-2-((R)-4-phenyl-4,5-dihydrooxazol-2-yl)aniline and dichloromethane were added to a round-bottom flask with three outlets, the system was put at −78° C. and added dropwise a dichloromethane solution of 4M BBr$_3$ slowly. After the dropping, the system was placed at room temperature to react for 12 hours. The reaction solution was slowly added dropwise to ice water, extracted with dichloromethane three times, and the organic phases were combined and dried over anhydrous sodium sulfate, the solvent was removed. Column chromatography separation (PE/EA=20:1~10:1) was carried out, thereby obtaining 0.34 g of orange product. The product of the reaction was a diphenylamine-linked chiral bis(oxazoline) ligand without C$_2$-symmetry of the present invention 4-hydroxy-N-(4-nitro-2-((R)-4-phenyl-4,5-dihydrooxazol-2-yl)phenyl)-2-((R)-4-phenyl-4,5-dihydrooxazol-2-yl)aniline.

3-o: $[\alpha]D^{20}$=−52 (c=1.0, CH$_2$Cl$_2$); $^1$H NMR (500 MHz, Chloroform-d) δ 11.25 (s, 1H), 8.81 (s, 1H), 8.08 (d, J=11.6 Hz, 1H), 7.36-7.33 (m, 1H), 7.32-7.17 (m, 11H), 7.05 (d, J=5.0 Hz, 2H), 6.90-6.84 (m, 2H), 5.36 (t, J=9.0 Hz, 1H), 5.15 (t, J=9.1 Hz, 1H), 4.69 (t, J=9.2 Hz, 1H), 4.42 (t, J=9.4 Hz, 1H), 4.23 (t, J=8.2 Hz, 1H), 3.89 (t, J=8.3 Hz, 1H). $^{13}$C NMR (126 MHz, Chloroform-d) δ 165.12, 163.36, 151.77, 141.91, 137.28, 130.37, 128.78, 128.72, 127.85, 127.83, 127.79, 127.71, 127.38, 126.61, 126.45, 123.98, 119.84, 117.54, 112.42, 108.92, 75.14, 73.39, 70.31, 69.04; melting point: 119-122° C.; HRMS: m/z calculated for C$_{30}$H$_{24}$N$_4$O$_5$Na ([M+Na]$^+$): 521.1819; found: 521.1815.

Example 16

The reaction formula was as follows:

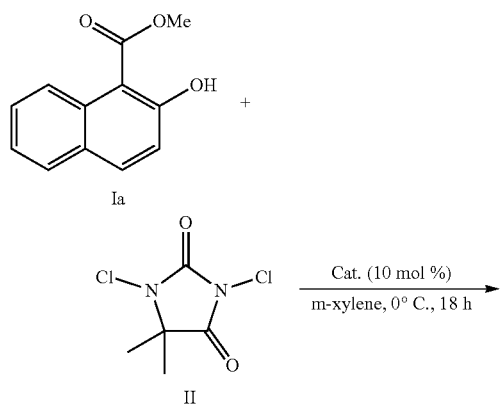

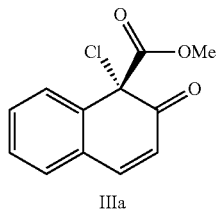

IIIa 0.02 mmol of complex of the oxazoline ligand 3-e and copper acetate and 2-hydroxy-1-naplithoate (0.2 mmol) were added to 10 mL tube, 2 mL of toluene was added and dissolved, the resulting solution was stirred for 10 min at 0° C., 1,3-dichloro-5,5-dimethylhydantoin of formula (I) (1.2 equiv.) was added, the system was stirred for 18 h at 0° C. The reaction solution was concentrated under reduced pressure and separated on a silica gel chromatography column, wherein a solution of petroleum ether and ethyl acetate in a volume ratio of 1-10:1 was used as the eluent for gradient elution, and the elution solution was collected and evaporated to remove the solvent, thereby obtaining a pale yellow solid product (yield 98%), $[\alpha]D^{20}$=790 (c=1.0, CH$_2$Cl$_2$). $^1$H NMR (500 MHz, Chloroform-d) δ 7.55-7.50 (m, 2H), 7.49-7.43 (m, 2H), 7.39 (dd, J=7.3, 1.7 Hz, 1H), 6.29 (d, J=10.0 Hz, 1H), 3.78 (s, 3H); $^{13}$C NMR (126 MHz, Chloroform-d) δ 189.81, 166.77, 145.59, 137.44, 131.01, 130.03, 129.94, 128.96, 128.39, 123.28, 67.35, 54.21 ppm. The product was analyzed by chiral HPLC, the specific conditions were as follows: Daicel Chiralpak OJ-H, N-hexane/isopropanol=70:30, flow speed 1.0 mL/min, detection wavelength 320 nm, $t_{R1}$=14.679 min (major), $t_{R2}$=20.812 min (minor). 90% ee. HRMS: m/z=259.0132 [M+Na]$^+$.

The reactants above were taken, the ligand 3-e was replaced by 0.02 mmol of one of the following ligands, the asymmetric chlorination dearomatization was carried out with the same conditions and operations as above, and the results were gathered in the following table:

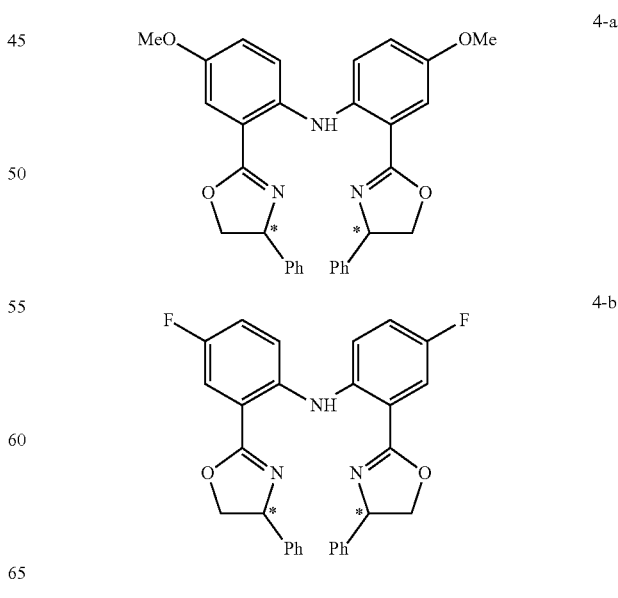

27
-continued

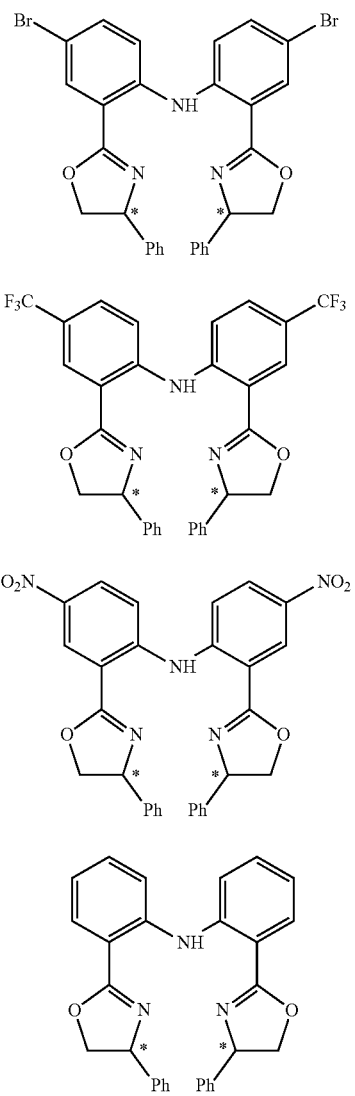

TABLE 1 experimental results of different ligands

| Number | Ligand | yield[%] | ee[%] |
|--------|--------|----------|-------|
| 1 | 3-a | 95 | 76 |
| 2 | 4-a | 78 | 59 |
| 3 | 3-b | 89 | 80 |
| 4 | 4-b | 96 | 70 |
| 5 | 3-c | 92 | 70 |
| 6 | 4-c | 94 | 68 |
| 7 | 3-d | 98 | 84 |
| 8 | 4-d | 98 | 73 |
| 9 | 3-e | 98 | 90 |
| 10 | 4-e | 97 | 80 |
| 11 | 5 | 92 | 70 |

28

Example 17

The reaction formula was as follows:

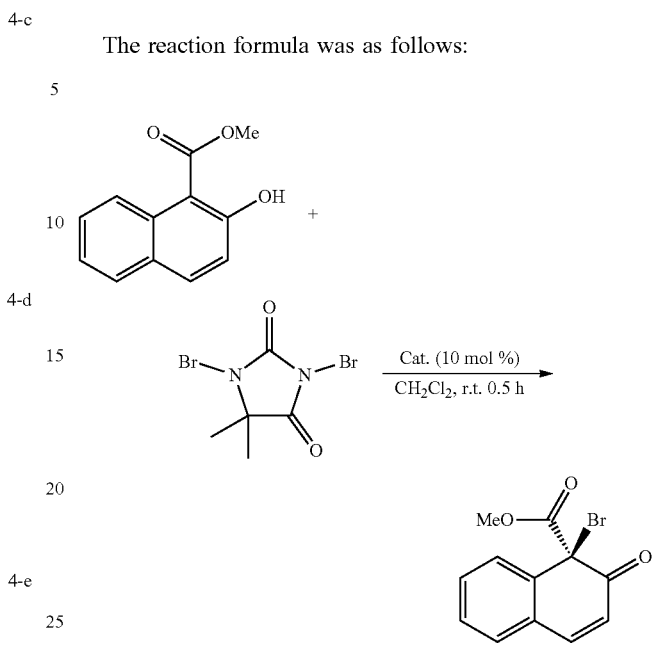

0.02 mmol of complex of the oxazoline ligand 3-a and copper trifluoromethanesulfonate was added to 2 mL of dichloromethane to dissolve and stirred at room temperature for 0.5 h, cooled to −45° C., then 2-hydroxy-1-naphthoate (0.2 mmol) was added, 1,3-dibromo-5,5-dimethylhydantoin of formula (II) (1.2 equiv.) was added and stirred for 0.5 h. The reaction solution was concentrated under reduced pressure and separated on a silica gel chromatography column, wherein a solution of petroleum ether and ethyl acetate in a volume ratio of 1-10:1 was used as the eluent for gradient elution, and the elution solution was collected and evaporated to remove the solvent, thereby obtaining a pale yellow solid product (yield 90%), $^1$H NMR (500 MHz, CDCl$_3$) δ=7.50 (d, J=10.0 Hz, 1H), 7.48-7.46 (m, 1H), 7.46-7.41 (m, 2H), 7.41-7.38 (m, 1H), 6.32 (d, J=10.1 Hz, 1H), 3.82 (s, 3H). $^{13}$C NMR (126 MHz, CDCl$_3$) δ=189.87, 166.67, 144.99, 138.05, 131.05, 130.12, 129.97, 129.17, 127.95, 123.26, 60.22, 54.46 ppm. The product was analyzed by chiral HPLC, the specific conditions were as follows: Daicel Chiralpak OD-H, 2-propanol:hexane=10:90, flow rate 1.0 mL/min, 254 nm); $t_R$=15.11 min, 20.37 min. 97% ee. HRMS: m/z=280.9811 [M+Na]$^+$

Example 18

The reaction formula was as follows:

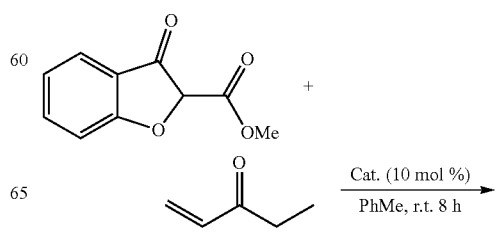

-continued

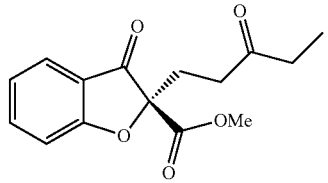

0.02 mmol of complex of the oxazoline ligand 3-n and copper trifluoromethanesulfonate and methyl 3-oxo-2,3-dihydrobenzofuran-2-carboxylate (0.2 mmol) were added to a 10 mL tube, 4 mL of toluene was added to dissolve and stirred at room temperature for 10 min, α,β-unsaturated enone (1.2 mmol) was added by injection needle and stirred at room temperature for 8 h. The reaction solution was concentrated under reduced pressure and separated on a silica gel chromatography column, wherein a solution of petroleum ether and ethyl acetate in a volume ratio of 1-10:1 was used as the eluent for gradient elution, and the elution solution was collected and evaporated to remove the solvent, thereby obtaining a yellow liquid product (yield 75%), $^1$H NMR (500 MHz, Chloroform-d) δ=7.70-7.64 (m, 2H), 7.20 (d, J=8.7 Hz, 1H), 7.15 (t, J=7.4 Hz, 1H), 3.77 (s, 3H), 2.64-2.58 (m, 1H), 2.52-2.49 (m, 2H), 2.42-2.34 (m, 3H), 1.03 (t, J=7.3 Hz, 3H) ppm. $^{13}$C NMR (125 MHz, Chloroform-d) δ=208.88, 195.53, 172.04, 166.06, 138.67, 125.02, 122.83, 119.41, 113.50, 90.28, 53.36, 35.83, 35.73, 27.90, 7.68 ppm. The product was analyzed by chiral HPLC, the specific conditions were as follows: Daicel Chiralpak OD-H, 2-propanol:hexane=10:90, flow rate 1.0 mL/min, 254 nm); $t_R$=18.2 min (minor), 20.5 min (major). 96% ee.

Example 19

The reaction formula was as follows:

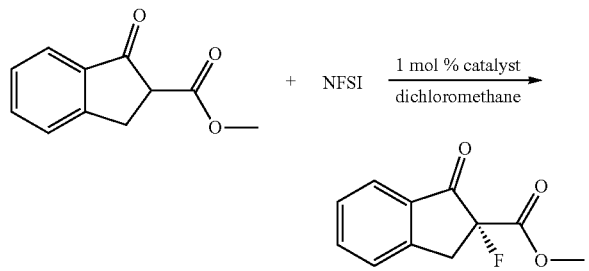

0.01 mmol of complex of the oxazoline ligand 3-d and copper trifluoroacetate as the chiral catalyst, methyl 1-oxo-2,3-indanone-2-carboxylate (1 mmol), N-fluorobisbenzenesulfonamide (1.2 mmol) were added to a 10 mL tube, 4 mL of dichloromethane was added to dissolve and stirred at room temperature for 8 h. The reaction solution was concentrated under reduced pressure and separated on a silica gel chromatography column, wherein a solution of petroleum ether and ethyl acetate in a volume ratio of 1-10:1 was used as the eluent for gradient elution, and the elution solution was collected and evaporated to remove the solvent, thereby obtaining a white solid product (yield 97%), $^1$H NMR (500 MHz, CDCl$_3$): δ 7.85 (d, J=7.7 Hz, 1H), 7.72 (t, J=8.0 Hz, 1H), 7.53-7.46 (m, 2H), 3.82 (s, 3H), 3.81 (dd, J=11.7, 17.7 Hz, 1H), 3.80 (d, J=11.3 Hz, 1H), 3.45 (dd, J=23.3, 17.6 Hz, 3H); $^{13}$C NMR (125 MHz, CDCl$_3$): δ 195.02 (d, $J_{CF}$=18.2 Hz), 167.74 (d, $J_{CF}$=27.9 Hz), 150.80 (d, $J_{CF}$=3.6 Hz), 136.72, 133.32, 128.67, 126.61, 125.68, 94.64 (d, $J_{CF}$=201.8 Hz), 38.29 (d, $J_{CF}$=24.0 Hz). The product was analyzed by chiral HPLC, the specific conditions were as follows: Daicel Chiralpak OD-H, Hexane:iPrOH=90:10, flow rate 1.0 ml/min, 254 nm: $t_R$ (major)=12.2 min, $t_R$ (minor)=14.1 min, 99% ee.

Example 20

The reaction formula was as follows:

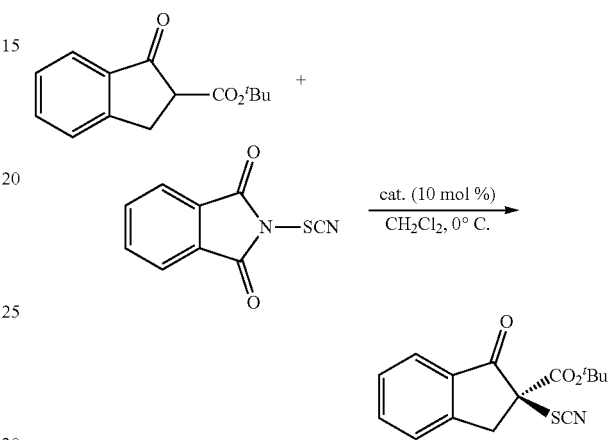

0.02 mmol of complex of the oxazoline ligand 3-a and copper trifluoromethanesulfonate and tert-butyl indanonate (0.2 mmol) were added to 10 mL tube, 2 mL of dichloromethane was added and dissolved, the resulting solution was stirred for 10 min at 0° C., N-thiocyanophthalimide of formula (II) (1.5 equiv.) was added, the reaction was carried out for 12 h at 0° C. The reaction solution was concentrated under reduced pressure and separated on a silica gel chromatography column, wherein a solution of petroleum ether and ethyl acetate in a volume ratio of 1-10:1 was used as the eluent for gradient elution, and the elution solution was collected and evaporated to remove the solvent, thereby obtaining a white solid product (yield 90%), [α]D$^{20}$=600 (c=1.0, CH$_2$Cl$_2$). $^1$H NMR (500 MHz, CDCl$_3$) δ=7.88 (d, J=7.7 Hz, 1H), 7.73 (td, J=7.7, 1.0 Hz, 1H), 7.55-7.47 (m, 2H), 4.06 (d, J=18.0 Hz, 1H), 3.63 (d, J=18.0 Hz, 1H), 1.45 (s, 9H). $^{13}$C NMR (126 MHz, CDCl$_3$) δ=194.97, 150.98, 136.74, 133.11, 128.80, 126.18, 125.80, 86.07, 64.19, 40.38, 27.65 ppm. The product was analyzed by chiral HPLC, the specific conditions were as follows: Daicel Chiralpak AD-H, 2-propanol:hexane=2:98, flow rate 1.0 mL/min, 285 nm; $t_R$=14.759 min, 15.852 min. 96% ee. HRMS: m/z=312.0663 [M+Na]$^+$.

Example 21

The reaction formula was as follows: IDC-44 C$_3$

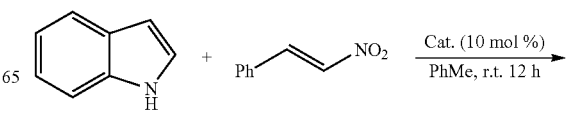

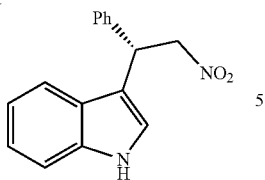

0.02 mmol of complex of the oxazoline ligand 3-e and zinc triflate, indole (0.2 mmol) and p-nitrostyrene (0.2 mmol) were added to 10 mL tube, 4 mL of toluene was added to dissolve and stirred at room temperature for 12 h. The reaction solution was concentrated under reduced pressure and separated on a silica gel chromatography column, wherein a solution of petroleum ether and ethyl acetate in a volume ratio of 1-10:1 was used as the eluent for gradient elution, and the elution solution was collected and evaporated to remove the solvent, thereby obtaining an oily liquid product (yield 93%). $^1$H NMR (300 MHz, Chloroform-d) δ 8.02 (s, 1H), 7.43 (d, J=7.8 Hz, 1H) 7.31-7.15 (m, 7H), 7.06 (t, J=7.6 Hz, 1H), 6.94 (d, J=2.4 Hz, 1H), 5.17 (t, J=8.1 Hz, 1H), 5.02 (dd, J=12.4, 7.6 Hz, 1H), 4.90 (dd, J=12.4, 8.6 Hz, 1H); $^{13}$C NMR (75 MHz, Chloroform-d) δ 139.1, 136.4, 128.9, 127.7, 127.5, 126.0, 122.7, 121.6, 119.9, 118.8, 114.3, 111.4, 79.5, 41.6. The product was analyzed by chiral HPLC, the specific conditions were as follows: Daicel Chiralpak OD-H, N-hexane/isopropanol=70:30, the flow speed is 1.0 mL/min, the detecting wavelength is 254 nm, $t_{R1}$=24.8 min (major), $t_{R2}$=20.4 min (minor), 98% ee.

The invention claimed is:

1. A diphenylamine-linked chiral bis(oxazoline) ligand without $C_2$-symmetry selected from one of the following:

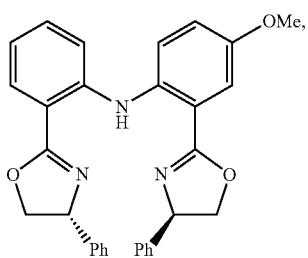

3-a

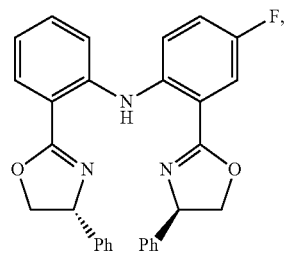

3-b

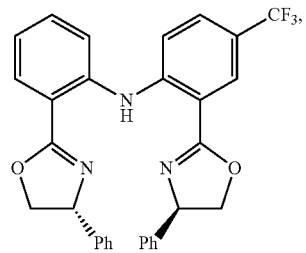

3-d

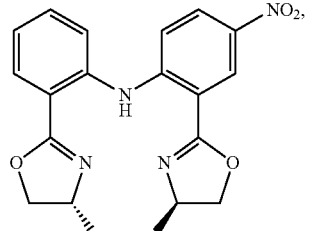

3-e

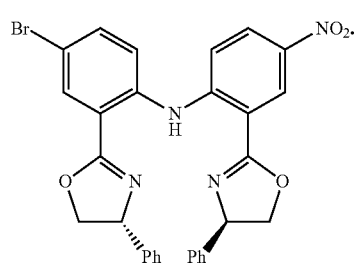

3-n

\* \* \* \* \*